US012314251B2

(12) United States Patent
Xiong et al.

(10) Patent No.: US 12,314,251 B2
(45) Date of Patent: May 27, 2025

(54) TRANSACTION PROCESSING METHOD AND APPARATUS, COMPUTING DEVICE, AND STORAGE MEDIUM

(71) Applicant: TENCENT TECHNOLOGY (SHENZHEN) COMPANY LIMITED, Shenzhen (CN)

(72) Inventors: Liangchun Xiong, Shenzhen (CN); Anqun Pan, Shenzhen (CN); Shuo Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/455,614

(22) Filed: Aug. 24, 2023

(65) Prior Publication Data

US 2023/0418811 A1 Dec. 28, 2023

Related U.S. Application Data

(63) Continuation of application No. PCT/CN2022/118941, filed on Sep. 15, 2022.

(30) Foreign Application Priority Data

Nov. 5, 2021 (CN) .......................... 202111305207.6

(51) Int. Cl.
*G06F 16/20* (2019.01)
*G06F 16/21* (2019.01)
(Continued)

(52) U.S. Cl.
CPC ........ *G06F 16/2379* (2019.01); *G06F 16/219* (2019.01); *G06F 16/2477* (2019.01)

(58) Field of Classification Search
None
See application file for complete search history.

(56) References Cited

U.S. PATENT DOCUMENTS

2019/0197524 A1* 6/2019 Vaures ............... G06K 7/10366

FOREIGN PATENT DOCUMENTS

CN   101604326 A   12/2009
CN   109408330 A   3/2019
(Continued)

OTHER PUBLICATIONS

China National Intellectual Property Administration (CNIPA) Office Action 1 for 202111305207.6, Jan. 19, 2023 11 Pages (including translation).

(Continued)

*Primary Examiner* — Belix M Ortiz Ditren
(74) *Attorney, Agent, or Firm* — Anova Law Group, PLLC

(57) ABSTRACT

A transaction processing method includes: determining a first moment from a query time period of a target transaction, the first moment being a moment at which a most recent dumping of historical-state data is completed, and the historical-state data meeting a data query condition of the target transaction; obtaining a full analysis result of the historical-state data by processing the historical-state data based on analysis semantic of the target transaction; obtaining an incremental analysis result based on a specific change that occurs on current-state data corresponding to the historical-state data, the specific change occurring between the first moment and an end moment of the query time period, and the incremental analysis result being obtained by processing, based on the analysis semantic, data obtained by the specific (Continued)

change; and obtaining a final analysis result of the target transaction based on the full analysis result and the incremental analysis result.

18 Claims, 12 Drawing Sheets

(51) Int. Cl.
  *G06F 16/23* (2019.01)
  *G06F 16/2458* (2019.01)

(56) References Cited

FOREIGN PATENT DOCUMENTS

| | | |
|---|---|---|
| CN | 110196758 A | 9/2019 |
| CN | 111930848 A | 11/2020 |
| CN | 112825069 A | 5/2021 |
| CN | 113206757 A | 8/2021 |
| CN | 113312330 A | 8/2021 |
| CN | 113342781 A | 9/2021 |
| WO | 2021169214 A1 | 9/2021 |

OTHER PUBLICATIONS

The World Intellectual Property Organization (WIPO) International Search Report for PCT/CN2022/118941 Dec. 14, 2022 12 Pages (including translation).
China National Intellectual Property Administration (CNIPA) Office Action 1 for 202111305207.6, Apr. 6, 2023 9 Pages (including translation).

* cited by examiner

TRANSACTION PROCESSING METHOD AND APPARATUS, COMPUTING DEVICE, AND STORAGE MEDIUM

CROSS-REFERENCES TO RELATED APPLICATIONS

This application is a continuation application of PCT Patent Application No. PCT/CN2022/118941, entitled "TRANSACTION PROCESSING METHOD AND APPARATUS, AND COMPUTING DEVICE AND STORAGE MEDIUM" and filed on Sep. 15, 2022, which claims priority to Chinese Patent Application No. 202111305207.6, entitled "TRANSACTION PROCESSING METHOD AND APPARATUS, COMPUTING DEVICE, AND STORAGE MEDIUM" filed with the China National Intellectual Property Administration on Nov. 5, 2021, the entire contents of both of which are incorporated herein by reference.

FIELD OF THE TECHNOLOGY

The present disclosure relates to the field of database technologies, and in particular, to a transaction processing method and apparatus, a computing device, and a storage medium.

BACKGROUND

With development of database technologies, in scenarios such as a data warehouse and big data analysis, a data processing system based on a hybrid transaction/analytical processing (HTAP) architecture is usually used. An HTAP system includes an online transaction processing (OLTP) cluster and an online analytical processing (OLAP) cluster. The OLTP cluster is used for processing a short-time user transaction, has characteristics of a short transaction execution time and a high concurrency degree, and has a high requirement for a throughput per unit time. The OLAP cluster is used for processing a complex analytical transaction, and has features such as a long transaction execution time, excessive resource occupation, and a large data amount.

In the foregoing HTAP system, a data migration module is configured between the OLAP cluster and the OLTP cluster, and is used for migrating latest related data in the OLTP cluster to the OLAP cluster, so as to ensure consistency of data analysis and processing performed by the OLAP cluster and the OLTP cluster. In other words, the HTAP system provided by the related technology provides an online transaction and analysis function only for the latest data, and an analysis and processing capability is relatively poor.

SUMMARY

Embodiments of the present disclosure provide a transaction processing method and apparatus, a computing device, and a storage medium, so that an online real-time analysis and processing service can be provided for any query time period on a full-state time line without being limited to providing an analysis function only for latest data, thereby improving an analysis and processing capability. The technical solutions are as follows:

According to one aspect, a transaction processing method is provided, where the method is performed by a computing device, and the method includes: determining a first moment from a query time period of a target transaction, the first moment being a moment at which a most recent dumping of historical-state data is completed, and the historical-state data being data that meets a data query condition of the target transaction; obtaining a full analysis result based on the historical-state data, the full analysis result being a result obtained by processing the historical-state data based on analysis semantic of the target transaction; obtaining an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and obtaining a final analysis result of the target transaction based on the full analysis result and the incremental analysis result.

According to one aspect, a transaction processing apparatus is provided, where the apparatus is deployed on a computing device, and the apparatus includes: a determining module, configured to determine a first moment from a query time period of a target transaction, the first moment being a moment at which a most recent dumping of historical-state data is completed, and the historical-state data being data that meets a data query condition of the target transaction; a first obtaining module, configured to obtain a full analysis result based on the historical-state data, the full analysis result being a result obtained by processing the historical-state data based on analysis semantic of the target transaction; a second obtaining module, configured to obtain an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and a third obtaining module, configured to obtain a final analysis result of the target transaction based on the full analysis result and the incremental analysis result.

According to one aspect, a computing device is provided, where the computing device includes one or more processors and one or more memories, the one or more memories store at least one computer program, and the at least one computer program is loaded and executed by the one or more processors to implement the transaction processing method according to any one of the foregoing embodiments.

According to one aspect, a non-transitory storage medium is provided, where the storage medium stores at least one computer program, and the at least one computer program is loaded and executed by a processor to implement the transaction processing method in any one of the foregoing embodiments.

The technical solutions provided in the embodiments of the present disclosure produce at least the following beneficial effects:

A query time period is determined for a target transaction, a first moment is used as a time point boundary in the query time period, a full analysis result is obtained by means of calculation for historical-state data before the first moment, an incremental analysis result is obtained by means of calculation for data obtained after a specific change after the first moment, and the full analysis result and the incremental analysis result are combined to finally obtain a final analysis result, so that an online real-time analysis and processing service can be provided for any query time period on a full-state time line without being limited to providing an analysis function only for latest data, thereby greatly improving transaction processing performance of a database system such as an HTAP system or an HTASP system.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure.

DESCRIPTION OF EMBODIMENTS

Figure 1:
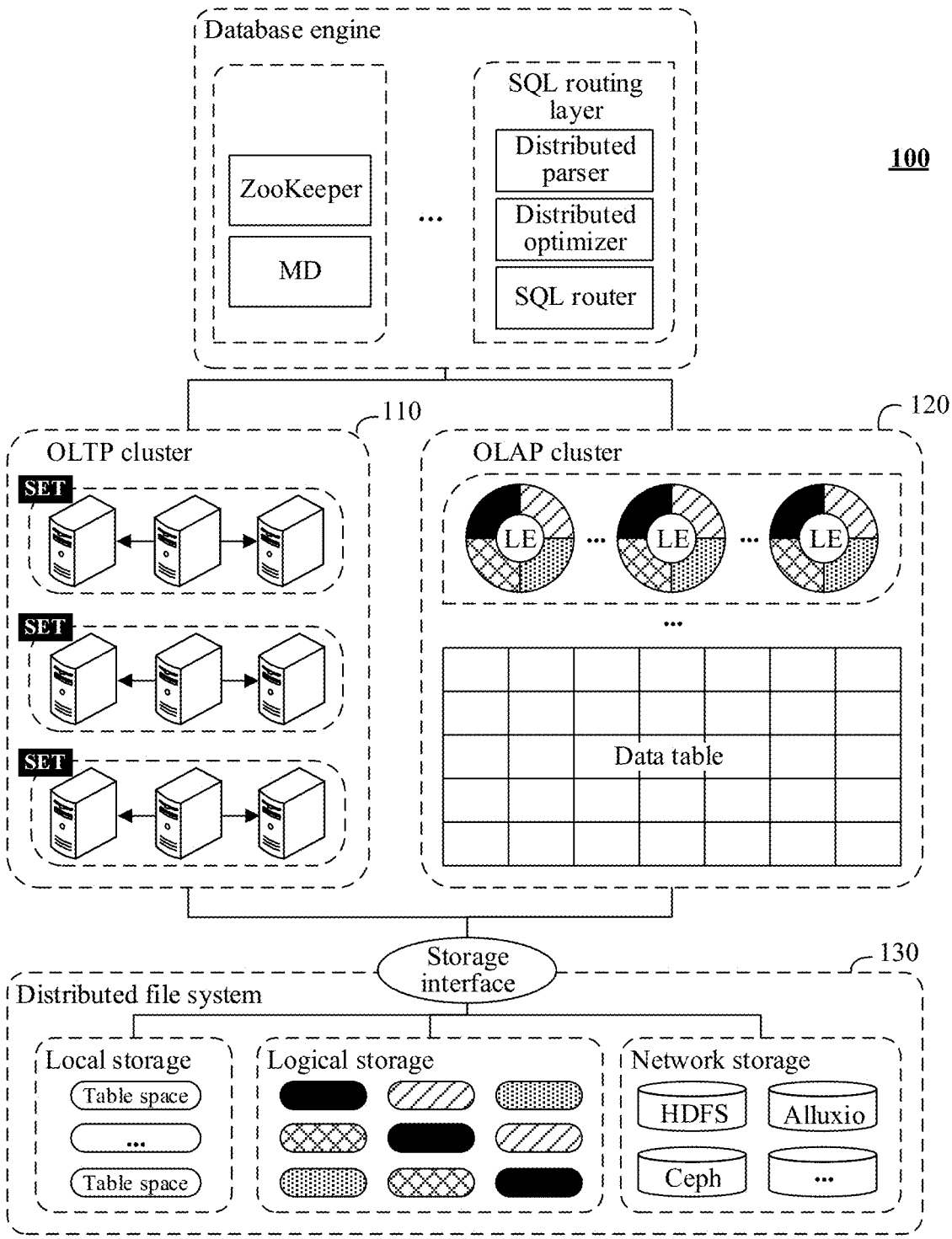
FIG. 1 is an architectural diagram of an implementation environment of an HTAP system according to an embodiment of the present disclosure.

To make objectives, technical solutions, and advantages of the present disclosure clearer, the following further describes implementations of the present disclosure in detail with reference to the accompanying drawings.

In the present disclosure, the terms "first," "second," and the like are used for distinguishing between same items or similar items that have basically same functions and functions. It is to be understood that "first," "second," and "nth" do not have logical or time sequence dependency, and a quantity and an execution sequence are not limited either.

In the present disclosure, the term "at least one" refers to one or more, and "a plurality of" refers to two or more. For example, a plurality of first locations refers to two or more first locations.

Before the embodiments of the present disclosure are described, some basic concepts in the field of cloud technologies need to be introduced.

Cloud technology: A hosting technology that unifies a series of resources, such as hardware, software, and a network, in a wide area network or a local area network, to implement computing, storage, processing, and sharing of data, that is, a general term of a network technology, an information technology, an integration technology, a management platform technology, an application technology, and the like that are applied based on a cloud computing business model. A resource pool may be formed, and is flexibly and conveniently used as required. Cloud computing will become an important support in the cloud technology field. A background service of a technology network system requires a large amount of computing and storage resources, such as a video website, a picture website, and more portals. With rapid development and application of the Internet industry, each item may have its own identification mark in the future. The identification mark needs to be transmitted to a background system for logical processing. Data at different levels will be processed separately. All types of industry data need to be supported by a powerful system, which can be implemented through cloud computing.

Cloud storage: Cloud storage is a new concept extended and developed on a concept of cloud computing. A distributed cloud storage system (hereinafter referred to as a storage system) refers to a storage system that combines various storage devices (also referred to as storage nodes) in a network by using functions such as a cluster application, a grid technology, and a distributed storage file system, to work together by using application software or application interfaces to provide data storage and service access functions to the outside.

Database: In short, it can be regarded as an electronic file cabinet—a place for storing electronic files. A user can perform operations such as adding, querying, updating, and deleting on data in the file. The so-called "database" is a data set that is stored together in a specific manner, can be shared with a plurality of users, has as little redundancy as possible, and is independent of an application program.

The following describes terms used in the embodiments of the present disclosure.

Computing device: That is, a computing node or a computing engine node, which mainly completes a computing function of a structured query language (SQL) layer, and may also be referred to as an SQL engine. In other words, the computing device refers to a node device that is used for processing a user-specific computing request (a user request for short) and is mainly responsible for executing the user request in a database (generally referring to a cluster database, and for a standalone database, a standalone device is a computing device).

Storage device: That is, a storage node or a storage engine node, which mainly completes a transaction and a storage function. In other words, the storage device is a node that is used in the database to process a storage data record and complete transaction execution and submission.

Online transaction processing (OLTP) system: The online transaction processing system is mainly used for processing a transactional transaction initiated by a user in a short time period. Features of the transactional transaction are as follows: A transaction execution time is short, and a concurrency degree is high. Therefore, a throughput requirement of the online transaction processing system within a unit time is high.

Online analytical processing (OLAP) system: The online analytical processing system is mainly used for processing a complex analytical transaction. Features of the analytical transaction are as follows: The analytical transaction has a long transaction execution time, occupies a large quantity of resources, and processes a large amount of data.

Hybrid transaction/analytical processing (HTAP) system: This is a data processing system with a mixture of online transactions and online analytics, and can be viewed as a converged system, expecting to support both transactional and analytical transactions within a single system.

Hybrid transaction/analytical/stream processing (HTASP) system: It refers to a data processing system in which a streaming computing capability is introduced based on the HTAP system.

Extract-Transform-Load (ETL): It is used for describing a process of extracting and transforming data from a source to upload the data to a destination. ETL is more commonly used in data warehouses, but ETL-operable objects are not limited to data warehouses.

Paxos algorithm: It is a message-based consensus algorithm with highly fault-tolerant characteristics.

Raft algorithm: It is a consensus algorithm for replacing Paxos. Compared with the Paxos algorithm, an objective of the Raft algorithm is to provide clearer logical division of work, so that the Raft algorithm can be better understood. In addition, the Raft algorithm has higher security, and can provide some additional characteristics. The Raft algorithm provides a common method for deploying finite state machines across a cluster of computers and ensures that any node within the cluster is consistent in a state transition.

Before the embodiments of the present disclosure are described, some basic concepts in a database technology need to be introduced.

The database in the embodiments of the present disclosure stores a plurality of data tables, and each data table may be used for storing a data record. The database may be any type of database based on multi-version concurrency control (MVCC). The type of the database is not specifically limited in the embodiments of the present disclosure. Data in the database is based on a state attribute, and may include three states: a current state, a transitional state, and a historical state, which are collectively referred to as "full states of data", referred to as full-state data. Each different state attribute in the full-state data may be used for identifying a state in which the data is located in a life cycle track of the data.

Current state: Data of the latest version of a data record is data at a current stage. A state of the data at the current stage is referred to as the current state.

Transitional state: Data that is not the latest version or a historical version of a data record, that is in a transition process from a current state to a historical state, and that is in a transitional state is referred to as half-attenuated data.

Historical state: A state of data record in history. Its value is an old value, not a current value. A state of data at a historical stage is referred to as a historical state. There may be a plurality of historical states of a data record, which reflects a data state transition process. Data in the historical state can only be read, not modified or deleted.

In the MVCC mechanism, all the foregoing three states of the data exist. In a non-MVCC mechanism, only the historical state and the current state of the data may exist. In the MVCC or a locked concurrent access control mechanism, a new value of data after a transaction is submitted is in a current state. The MVCC mechanism is used as an example. A state of data generated by a transaction before a smallest transaction in a current active transaction list is in a historical state. In the locked concurrent access control mechanism, after a transaction is submitted, a value of data before the submission changes to a value in the historical state, that is, an old value of the data record is in the historical state. However, an active transaction (a non-latest related transaction) is still in use in a read version. However, because the latest related transaction modifies a value of a data record, the latest value thereof is already in a current state, and the read value is already in a historical state relative to the current state. Therefore, the data state thereof is between the current state and the historical state, and is referred to as a transitional state.

For example, in the MVCC mechanism, a balance of an account A in a user table changes from CNY 10 to CNY 20, and then CNY 15 is consumed to left CNY 5. In this case, a financial institution B continuously reads data for a check transaction. Then CNY 20 is recharged for A to left CNY 25, and then CNY 25 is current-state data. CNY 5 that is being read by B is in the transitional state. The remaining two values CNY 20 and CNY 10 are states existing historically, and are both historical-state data.

Visibility of a data record: Whether a data record is visible (that is, visibility of the data record) is specific to a transaction. A data record may be visible to some transactions, and is invisible to some other transactions. In the embodiments of the present disclosure, it is determined whether a data record in the historical state (that is, historical-state data) is visible in a query time period of a target transaction. A related visibility determining algorithm is described in a subsequent embodiment, and details are not described herein.

An HTAP system provided in a related technology includes an OLTP cluster and an OLAP cluster. The OLTP cluster is configured to process a short-time user transactional transaction, and the OLAP cluster is configured to process a complex analytical transaction. A data migration module is configured between the OLAP cluster and the OLTP cluster, and is used for migrating latest related data in the OLTP cluster to the OLAP cluster, so as to ensure consistency of data analysis and processing performed by the OLAP cluster and the OLTP cluster. After a specific change is made to a data record in the OLTP cluster, a function of storing historical-state data is not provided, that is, when a data record is changed from an old value to a new value, the old value is directly overwritten by the new value. Subsequently, if the OLAP cluster receives an analytical transaction of a modified data record, a data migration module needs to be used for synchronizing a data record of a latest version in the OLTP cluster to the OLAP cluster, and then perform analysis and processing on the synchronized data record. In other words, the HTAP system provided in a related technology supports only providing an online transaction and analysis function for the latest data, and cannot provide an online analytical function for historical-state data in any time point or time period specified on a time line.

In view of this, the embodiments of the present disclosure provide a transaction processing method. For each data record stored in the HTAP system, a full-state data storage function in a time dimension is provided, that is, all current-state data, transitional-state data, and historical-state data are stored in the HTAP system. After a data record is modified, a data record of a latest version (current-state data) and a data record that changes to a historical version (historical-state data) are stored in a storage device of a storage cluster. In addition, streaming analysis and processing functions are further provided in the HTAP system to the outside by using a streaming computing processing engine. The HTAP system that integrates the streaming computing processing engine is also referred to as an HTASP system.

In other words, the HTASP system that integrates the streaming computing processing engine is provided based on a time dimension of full-state data. In the entire HTASP system, an OLTP cluster and an OLAP cluster can complete a transaction or an analysis by using same full-state data, and coupling of the OLTP cluster and the OLAP cluster that is caused by a data migration module is greatly reduced, so that the OLTP cluster and the OLAP cluster are isolated from each other and do not affect each other during transaction processing.

Because related information of a time dimension is added to each data record, the OLAP cluster supports not only a function of analyzing a data record of a latest version. In addition, after defining a real-time degree parameter of online analysis, a user can perform analysis on historical-state data at a fine granularity of a record level. In addition, after defining a time window for an incremental analysis result and a calculation period for a full analysis result, the user can perform full analysis once every other calculation period, and perform incremental analysis once every other time window in each calculation period. That is, a combination of parallel computing and streaming computing at a minimum granularity is provided, so that a function of constructing an HTASP system on the same piece of full-state data and providing a high-quality data service externally is implemented.

The embodiments of the present disclosure may be applied to various data processing systems that support hybrid transaction/analysis, such as the HTAP system and the HTASP system. In addition, the embodiments of the present disclosure may be further applied to a database system (hereinafter referred to as a "blockchain system") that is based on a blockchain technology. The blockchain system essentially belongs to a decentralized distributed database system. A consensus algorithm is used for keeping consistency of ledger data recorded by different computing devices on a blockchain, a cryptographic algorithm is used for ensuring encrypted transmission of ledger data between different computing devices and avoiding tampering, a ledger function is extended by using a script system, and interconnection between different computing devices is performed by using network routing.

The blockchain system may include one or more blockchains. The blockchain is a string of data blocks generated through association by using a cryptographic method. Each data block includes information of a batch of network transactions, the information being used for verifying the validity of information of the data block (anti-counterfeiting) and generating a next data block. For example, in the HTAP system, a log record of each completed transactional transaction is used as ledger data, and a blockchain system is constructed. Each computing device stores a batch of network transaction information (that is, a log record), and after the network transaction information is chained, traceability of historical transaction information (historical-state data) at any moment can be implemented.

In the blockchain system, computing devices may form a peer-to-peer (P2P) network. The P2P protocol is an application layer protocol that runs above the Transmission Control Protocol (TCP). In the blockchain system, any computing device may have the following functions: 1) a route, which is a basic function of a computing device and is used for supporting communication between computing devices; 2) an application, configured to: be deployed in a blockchain; implement a specific service according to an actual service requirement; record data related to an implementation function to form ledger data; add a digital signature to the ledger data to indicate a data source; and send the ledger data to another computing device in the blockchain system, so that the another computing device adds the ledger data to a temporary block when successfully verifying a source of the ledger data and integrity, where a service implemented by the application may include a wallet, a shared ledger, a smart contract, and the like; and 3) a blockchain, including a series of blocks that are connected to each other in a chronological sequence, where once a new block is added to the blockchain, the new block is no longer removed, and the block records ledger data submitted by a computing device in the blockchain system.

In some embodiments, each block may include a hash value of a current block storage transaction record (a hash value of the current block) and a hash value of a previous block, and each block is connected by using the hash value to form a blockchain. In addition, the block may further include information such as a timestamp when the block is generated.

FIG. 1 is an architectural diagram of an implementation environment of an HTAP system according to an embodiment of the present disclosure. Referring to FIG. 1, an HTAP system 100 includes an OLTP cluster 110 and an OLAP cluster 120.

The OLTP cluster 110 is configured to provide an online transaction function. The OLTP cluster 110 includes a plurality of TP computing nodes. The TP computing node is configured to process a transactional transaction. When the transactional transaction completes modification of a data record, generated historical-state data is dumped to a distributed file system 130 by using a storage interface. A database engine is configured for each TP computing node, and each TP computing node may be a standalone device, a master cluster device, a slave cluster device, or the like. A type of the TP computing node is not specifically limited in this embodiment of the present disclosure.

The OLAP cluster 120 is configured to provide an online analytical function. The OLAP cluster 120 includes a plurality of AP computing nodes, the AP computing node is configured to process an analytical transaction, and the analytical transaction includes but is not limited to: querying historical-state data, or further processing queried historical-state data to obtain an analysis result. For example, in a financial scenario, the analytical transaction T1 is that a user queries a total quantity of itemized accounts in the past month. In this case, the analytical transaction T1 needs to query, in the distributed file system 130, a transaction record made by the user in the past month, and summate spent amounts. An obtained total quantity of itemized accounts is an analysis result of the analytical transaction T1. For another example, in a smart transportation scenario, the analytical transaction T2 is that a user queries a total quantity of newly-added parking spaces in each administrative region in a city in the past week. In this case, the analytical transaction T2 needs to query, in the distributed file system 130 by using each administrative region in the city as a unit, an insertion record of the newly-added parking space in each administrative region, and summate a quantity of inserted newly-added parking spaces. A set formed by the total quantity of newly added parking spaces in each administrative region is an analysis result of the analytical transaction T2.

Both the OLTP cluster 110 and the OLAP cluster 120 can access the distributed file system 130 by using the storage interface, and both the OLTP cluster 110 and the OLAP cluster 120 can be directly or indirectly connected to the distributed file system 130 in a wired or wireless communication manner. This is not specifically limited in this embodiment of the present disclosure.

The distributed file system 130 can provide an infinite storage function for the OLTP cluster 110 and the OLAP cluster 120. The distributed file system 130 includes a plurality of storage nodes, that is, storage devices. The distributed file system 130 may partition full-state data according to a cold-hot level, and allocate data with the same cold-hot level to storage devices in the same partition for storage, or allocate data with the same cold-hot level to storage media of storage devices in the same partition for storage. For example, the distributed file system 130 includes but is not limited to: Hadoop Distributed File System (HDFS), Ceph (a distributed file system in Linux system), Alluxio (a memory-based distributed file system), and the like.

In some embodiments, because the TP computing device provides an online transaction function, at a moment at which any transactional transaction is submitted, when new current-state data is generated, historical-state data corresponding to the current-state data is also generated. Because the historical-state data occupies a relatively large amount of storage space, and the historical-state data has a storage value, the historical-state data is dumped to a corresponding storage device in the distributed file system for persistent storage. After dumping of the historical-state data is completed, the TP computing node may delete the currently dumped historical-state data, to clear more storage space.

In some embodiments, after successfully dumping the historical-state data to the storage device, the TP computing node may further register metadata of the currently dumped historical-state data into a metadata (MD) manager, so that the storage device collects, based on the metadata manager, metadata information of the reserved historical-state data.

In some embodiments, after a user load arrives at the HTAP system 100, a database engine parses the user load (i.e., user transactions, including transactional transactions or analytical transactions), and routes the user load to the OLTP cluster 110 or the OLAP cluster 120 for processing based on semantics and metadata of a query statement and a query operation provided in a structured query language router (SQL Router) layer. For example, the OLTP cluster 110 mainly provides a query and modification service for current-state data, and the OLAP cluster 120 mainly provides a query and analysis service for historical-state data (modifying or deleting historical-state data is not supported). The semantics of the query operation is an operation intention obtained by means of analysis according to the query statement. For example, a condition of a WHERE clause may represent an intention of the WHERE clause.

In the foregoing architecture, a database instance set of one or more databases corresponding to each TP computing node or AP computing node (collectively referred to as a computing nods) is referred to as a set. In some embodiments, if the computing node is a standalone device, a database instance of the standalone device is a set. If the computing node is a cluster device with one master and two slaves, the set of the computing node is a master database instance and a set of two slave database instances. In this case, consistency between data of the master and copy data of the slaves is ensured based on a strong synchronization technology of a cloud database. In some embodiments, each set supports linear expansion to meet service processing requirements in big data scenarios.

In some embodiments, the OLTP cluster 110 or the OLAP cluster 120 manages the TP computing node or the AP computing node by using a distributed coordination system (for example, ZooKeeper). For example, the TP computing node or the AP computing node is invalidated by using ZooKeeper (that is, the TP computing node or the AP computing node is deleted from the OLTP cluster 110 or the OLAP cluster 120).

In some embodiments, the HTAP system 100 may be considered as a server that provides a hybrid transaction and analysis function to the outside. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the user load is a user transaction initiated by the user to the HTAP system 100 by using a terminal. A terminal on a user side is also referred to as user equipment, a terminal device, a user terminal, a mobile terminal, an intelligent terminal, a communication device, and the like. In some embodiments, device types of the terminal include: a smartphone, a tablet computer, a notebook computer, a desktop computer, a smart sound box, a smart watch, an in-vehicle terminal, a smart appliance, an intelligent voice interaction device, and the like, but are not limited thereto.

The following describes a logical transaction procedure under a system architecture in an embodiment of the present disclosure.

Figure 2:
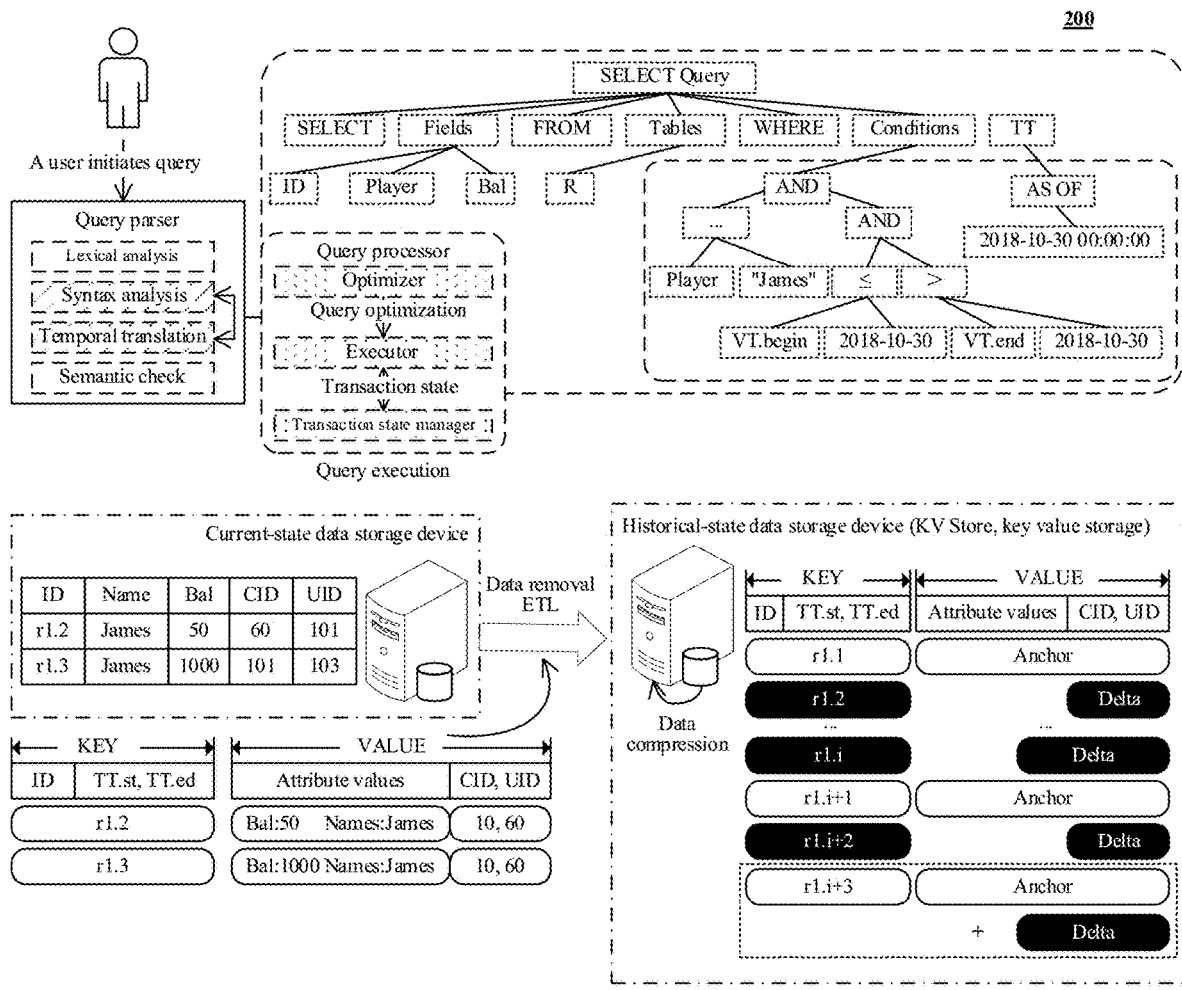
FIG. 2 is a logical block diagram of a transaction processing procedure according to an embodiment of the present disclosure.

FIG. 2 is a logical block diagram of a transaction processing procedure according to an embodiment of the present disclosure. As shown in FIG. 200, in the HTAP system to which this embodiment of the present disclosure is applicable, the HTAP system receives an HTAP statement initiated by a user, inputs the HTAP statement into a query parser, and successively performs lexical analysis, syntax analysis, temporal translation, and semantic check on the HTAP statement. In a process of syntax analysis and temporal translation, a query statement (SELECT Query) needs to be first rewritten according to a query tree, and then the rewritten query is input into an optimizer for query optimization. Then a transaction status is applied for a query transaction of the query statement from a transaction status manager, and then the query statement output by the optimizer and the transaction status output by the transaction status manager are input together into an executor for query execution.

In a storage cluster (for example, a distributed file system) of the HTAP system, current-state data and historical-state data are separately stored in different storage devices. For example, a data record with a relatively high cold-hot level (for example, both an access frequency and a modification frequency are extremely high) is stored in a current-state data storage device. Over time, if cold-hot levels of some data records in the current-state data storage device decrease, the some data records with the decreased cold-hot levels may be extracted and transformed in an ETL manner, and finally loaded to a historical-state data storage device for persistent storage. In some embodiments, the historical-state data storage device may compress the loaded historical-state data. For example, for each historical version of a data record, only full (anchor) data of some historical versions is stored, and the remaining other historical versions are stored in a manner of incremental (delta) data between the other historical versions and previous full data.

In the foregoing processing procedure, each data record is inserted to be updated, and versions (including a current version and one or more historical versions) arranged in a time dimension are completely retained. Data of these versions reflects an operation performed on a data record each time a related transaction occurs since a data record is inserted. The HTAP system or the HTASP system is established based on full-state data, so that the HTAP system or the HTASP system can be implemented based on only one set of full-state data. In addition, when the OLTP cluster and the OLAP cluster run, a degree of coupling between the OLTP cluster and the OLAP cluster is minimized based on a real-time degree parameter set by a user, in other words, mutual impact between the OLTP cluster and the OLAP cluster is minimized.

By using full-state data, a streaming computing capability can be easily introduced into the HTAP system to transform the HTAP system into the HTASP system, and various versions of a data record can be divided at a recording level according to a time line at a fine granularity, so that a big task of real-time analysis is divided at a smaller granularity, and a higher level of expansion capability is improved.

Based on a time window, an execution mode of obtaining an analysis result by means of full and incremental combination is provided for the entire HTAP system or the HTASP system, so that computing resources can be saved to the greatest extent, and an analysis and processing capability of the OLAP cluster can be improved.

In the distributed database cluster, historical-state data is dumped by using a data block as a unit, so that impact on the OLTP cluster caused by dumping the historical-state data can be reduced, and normal working of the OLTP cluster is not affected.

Figure 3:
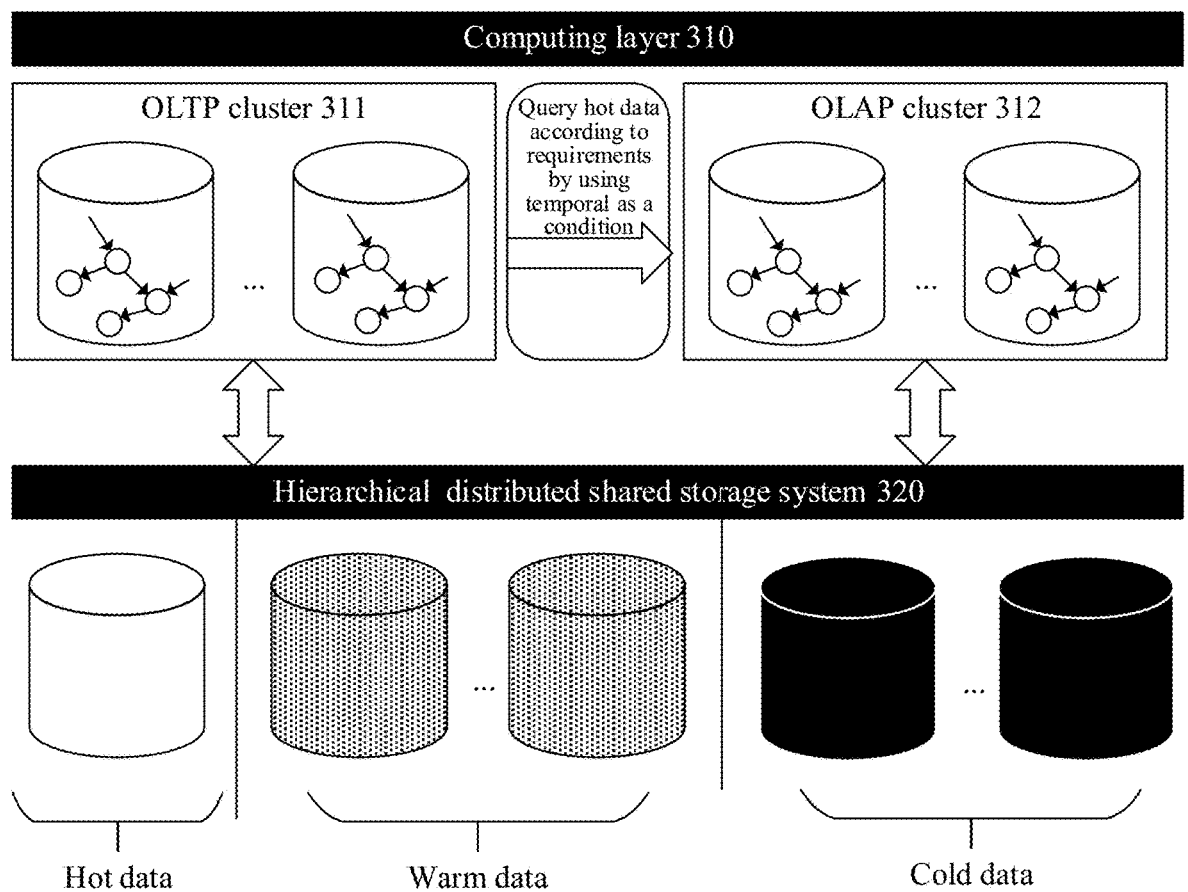
FIG. 3 is a schematic diagram of an implementation environment of a transaction processing method according to an embodiment of the present disclosure.

FIG. 3 is a schematic diagram of an implementation environment of a transaction processing method according to an embodiment of the present disclosure. As shown in FIG. 3, FIG. 3 shows a real-time analysis system or a real-time analysis model based on an HTAP architecture. Because full-state data is introduced into the real-time analysis system, an original HTAP does not support analysis on historical-state data, and full analysis (equivalent to a one-layer calculation mode) needs to be performed on current-state data each time. However, according to the real-time analysis system provided in this embodiment of the present disclosure, historical-state data is dumped, so that analysis can be performed on the historical-state data. In addition, full analysis does not need to be performed on the current-state data each time, but a full analysis result previously calculated at a time point can be converted into an incremental analysis result obtained by means of calculation from the time point to a time point specified by a real-time analytical transaction (if not specified by a user, the incremental analysis result can be obtained by means of calculation according to a real-time degree parameter of the system). The final analysis result is obtained through consolidation, that is, a two-layer real-time analysis model is provided.

The real-time analysis system includes a computing layer 310 and a hierarchical distributed shared storage system 320. The computing layer 310 includes an OLTP cluster 311 and an OLAP cluster 312. The OLTP cluster 311 generally provides an online transaction function for a short-time transactional transaction initiated on current-state data and transitional-state data, and the OLAP cluster 312 generally provides an online analytical function for a complex analytical transaction initiated on historical-state data. Both the OLTP cluster 311 and the OLAP cluster 312 can access full-state data stored in the hierarchical distributed shared storage system 320. For example, all data in the system is divided into the following several partitions according to a cold-hot level of the full-state data: hot data, warm data, cold data, etc. A division manner of a cold-hot level is described in detail in a subsequent embodiment, and details are not described herein.

In some embodiments, if an analytical transaction arriving at the OLAP cluster 312 does not involve hot data, no interaction with the OLTP cluster 311 is required during execution of the analytical transaction. If an analytical transaction arriving at the OLAP cluster 312 involves hot data, and this part of newly modified hot data has not been dumped into the hierarchical distributed shared storage system 320, the OLAP cluster 312 queries, according to a service requirement of the analytical transaction and by using a temporal as a condition (that is, a query time period), hot data that has not been dumped from the OLAP cluster 311.

Figure 4:
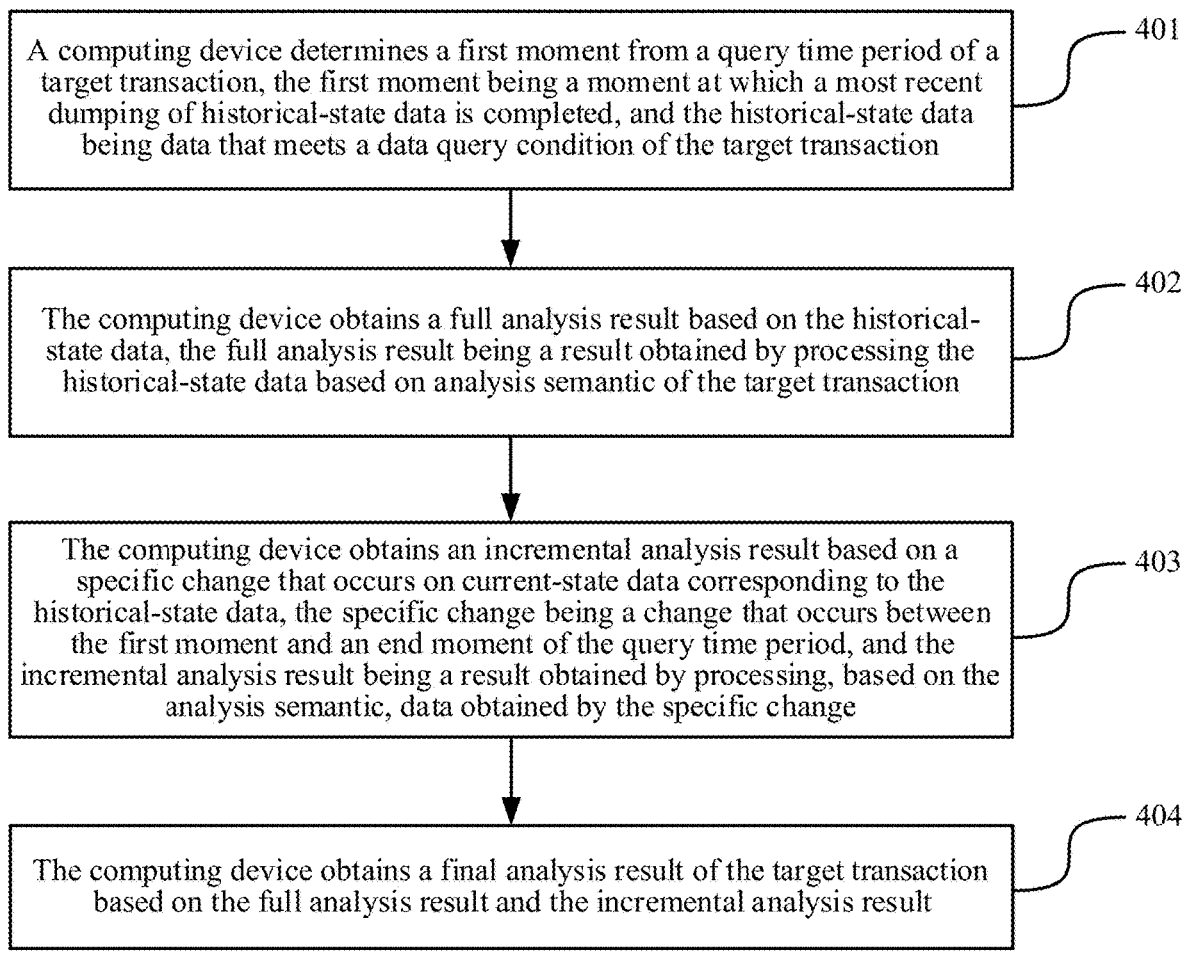
FIG. 4 is a flowchart of a transaction processing method according to an embodiment of the present disclosure.

FIG. 4 is a flowchart of a transaction processing method according to an embodiment of the present disclosure. Referring to FIG. 4, this embodiment is applicable to a data processing system that supports real-time analysis, such as an HTAP system, an HTASP system, or a blockchain system. The transaction processing method is performed by any computing device in an OLAP cluster. This embodiment includes the following steps.

401. The computing device determines a first moment from a query time period of a target transaction to be analyzed, the first moment being a moment at which a most recent dumping of historical-state data is completed, and the historical-state data being data that meets a data query condition of the target transaction.

The target transaction is any possible analytical transaction. For example, the analytical transaction includes but is not limited to: a query transaction, a read-only transaction, or a transaction for analyzing or processing a query result. For example, an exemplary analytical transaction in a financial scenario is: querying a total quantity of itemized accounts in the past month. For another example, an exemplary analytical transaction in a smart transportation scenario is: querying a total quantity of newly-added parking spaces in each administrative region in a city in the past week.

The query time period is a time interval formed by a start moment and an end moment. The start moment or the end moment of the query time period may be customized according to a user request. If the start moment or the end moment is not defined in the user request, a database engine configures the query time period for the target transaction.

The first moment is a moment at which all historical-state data that meets a data query condition of the target transaction is dumped most recently, the data query condition is obtained by parsing an SQL statement of the target transaction, and the foregoing dumping process is: migrating the historical-state data generated by the OLTP cluster to a storage device in a storage cluster for storage.

In some embodiments, a user logs in to an application client on a terminal, and triggers the application client to generate a user request. For example, in a financial scenario, the user request is to request to query a total quantity of itemized accounts of the user in the past month. For another example, in a smart transportation scenario, the user request is to request to query a total quantity of newly-added parking spaces in each administrative region in a city in the past week. A type of the user request is not specifically limited in this embodiment of the present disclosure. After generating the user request, the application client may invoke an application programming interface (API) to send the user request to a computing device. For example, the API may be a MySQL API (an API provided by a relational database system).

In some embodiments, the computing device receives any user request from the application client, parses a header field of the user request, and when the header field indicates that the user request is an analytical transaction, parses a data field of the user request to obtain an SQL statement (for example, a SELECT Query statement) carried in the user request, and sends the SQL statement to the query parser. The query parser performs lexical analysis, syntax analysis, temporal translation, and semantic check on the SQL statement to obtain a data query condition and analytic semantics (for example, summation, averaging, and sorting) of the SQL statement. In addition, if a start moment of the query time period is specified in the SQL statement, the start moment is obtained; or if an end moment of the query time period is specified in the SQL statement, the end moment is obtained. Then, a corresponding target transaction is constructed based on the SQL statement. The computing device creates a process or a thread for the target transaction, or reuses a created process or thread, and processes the target transaction by using the process or the thread.

For example, when the start moment of the query time period is specified for the target transaction, the start moment specified for the target transaction is used. When the start moment of the query time period is not specified for the target transaction, in one embodiment, an effective moment of a latest version of the data queried by the target transaction is used, that is, the effective moment of the latest version of the data that meets the data query condition is determined as the start moment. When a plurality of pieces of data need to be queried, a corresponding visible version is selected based on an effective moment of a latest version of each piece of data for analysis. In one embodiment, an effective moment of an inserted version of data queried by a target transaction is used, that is, the effective moment of the inserted version of data that meets the data query condition is determined as the start moment. When a plurality of pieces of data are queried, a corresponding visible version is selected based on an effective moment at which a version is inserted into each piece of data for analysis. A manner of determining the start moment is not specifically limited in this embodiment of the present disclosure.

For example, when the end moment of the query time period is specified for the target transaction, the end moment specified for the target transaction is used. When the end moment of the query time period is not specified for the target transaction, in one embodiment, a real-time degree parameter in the database system is obtained, where the real-time degree parameter is used for representing a maximum delay supported by data of analytical transaction processing in the database system. In other words, the database system may allow use of historical-state data how long ago for analysis. For example, if the real-time degree parameter is set to 1 hour, it indicates that the database system allows analysis by using historical-state data 1 hour ago. In one embodiment, the real-time degree parameter is customized by a management user. If the management user has not set the real-time degree parameter, a default value (for example, 1 second) of the database system is used. The default value may also be modified. This is not specifically limited in this embodiment of the present disclosure. After the real-time degree parameter is obtained, the end moment is determined based on the real-time degree parameter. In one embodiment, a moment before a current moment and whose distance to the current moment reaches the real-time degree parameter is determined as the end moment. A manner of determining the end moment is not specifically limited in this embodiment of the present disclosure.

After the start moment and the end moment are determined based on the foregoing manner, the query time period from the start moment to the end moment may be obtained. In one embodiment, the query time period is a closed interval, that is, the query time period includes both the start moment of the left endpoint and the end moment of the right endpoint; or the query time period is a left-closed right-open time interval, that is, the query time period includes the start moment of the left endpoint but does not include the end moment of the right endpoint. A feature of a left-closed right-open time interval is as follows: For the start moment, data that is effective at the start moment is visible, and for the end moment, data that is effective at the end moment is invisible. This is used for determining visibility of auxiliary data. In one embodiment, the user may specify whether the query time period includes the end moment of the right endpoint. If the query time period includes the end moment, the query time period is a closed interval. If the query time period does not include the end moment, the query time period is a left-closed right-open time interval. If the user does not specify whether the query time period includes the end moment, the query time period may include the end moment by default, that is, the query time period is a closed interval by default.

In some embodiments, after the computing device determines the query time period and the data query condition, because the OLTP cluster periodically migrates the historical-state data generated by the transactional transaction of the OLTP cluster to the storage device in the storage cluster for persistent storage, the foregoing process of migrating the historical-state data is a process of dumping the historical-state data. A related record is usually generated each time dumping is performed. For example, specific historical-state data that is dumped at this time is recorded in a meta information manager of the storage cluster, or a table is specially maintained to record a completion time of each dumping. Therefore, it is easy to find a moment (that is, the first moment) at which most recent dumping of all historical-state data that meets the data query condition of the target transaction is completed.

402. The computing device obtains a full analysis result based on the historical-state data, the full analysis result being a result obtained by processing the historical-state data based on analysis semantic of the target transaction.

In some embodiments, the first moment is used as a boundary. The query time period may be divided into two subintervals: a first subinterval from the start moment to the first moment and a second subinterval from the first moment to the end moment. A full analysis result of the first subinterval and an incremental analysis result of the second subinterval are combined to obtain the final analysis result.

In some embodiments, because the database system may cache the intermediate analysis result at the second moment from the start moment to the first moment, according to a visibility determining algorithm, in this case, the final analysis result can be obtained by combining the cached intermediate analysis result and the incremental analysis result of the second subinterval, that is, the full analysis result at the first moment does not need to be repeatedly calculated.

In one embodiment, a manner of obtaining the full analysis result based on the historical-state data may be querying whether to cache an intermediate analysis result of the first historical-state data visible at the second moment, where the second moment is any moment between the start moment of the query time period and the first moment; and then when the intermediate analysis result is already cached, determining the intermediate analysis result as the full analysis result. When the intermediate analysis result is not cached, the full analysis result of the second historical-state data visible at the first moment is generated. A manner of the visibility determining algorithm and generating the full analysis result is described in detail in the next embodiment, and details are not described herein.

In the foregoing process, whether the intermediate analysis result is cached is determined, so as to avoid repeatedly calculating the full analysis result at the first moment when the intermediate analysis result is cached. Therefore, computing resources of the computing device can be greatly saved.

403. The computing device obtains an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change.

Because the first moment is a moment at which the corresponding historical-state data is most recently dumped, it indicates that data between the first moment and the end moment has not been dumped from the OLTP cluster to the storage cluster. Therefore, the log generated due to the specific change needs to be first obtained from the OLTP cluster, and the log generated due to the specific change is played back to obtain the data obtained due to the specific change. Then, historical-state data with the same primary key identifier and the data obtained due to the specific change are compared, and a comparison result is processed according to analysis semantics of the SQL statement of the target transaction, to generate the incremental analysis result. The incremental analysis result represents only a change between the incremental analysis result and a previous full analysis result, and is not a full analysis result obtained by means of new calculation.

In the foregoing process, only the incremental analysis result is obtained by using data obtained due to the specific change, and the full analysis result does not need to be obtained. Because an amount of data that needs to be analyzed for the incremental analysis result is relatively small, and a time consumed is relatively small, calculation overheads and processing resources of the computing device can be greatly reduced.

404. The computing device obtains a final analysis result of the target transaction based on the full analysis result and the incremental analysis result.

In some embodiments, the incremental analysis result includes an analysis result before the specific change and an analysis result after the specific change. Therefore, when the full analysis result and the incremental analysis result are combined, the full analysis result needs to be subtracted from the analysis result before the specific change, to obtain a first analysis result; and the first analysis result is added to the analysis result obtained after the specific change, to obtain the final analysis result.

In the foregoing process, in a manner of obtaining a final analysis result by combining full calculation and incremental calculation, a single-layer calculation model can be converted into a two-layer real-time analysis model, which can adapt to an HTAP system or an HTASP system that is based on a full-state database, and can save calculation resources in the entire system.

All the foregoing example technical solutions can be combined in different manners to form other embodiments of this disclosure, and details are not described herein.

According to the method provided in this embodiment of the present disclosure, a query time period is determined for a target transaction, a first moment is used as a time point boundary in the query time period, a full analysis result is obtained by means of calculation for historical-state data before the first moment, an incremental analysis result is obtained by means of calculation for data obtained after a specific change after the first moment, and the full analysis result and the incremental analysis result are combined to finally obtain a final analysis result, so that an online real-time analysis and processing service can be provided for any query time period on a full-state time line without being limited to providing an analysis function only for latest data, thereby greatly improving transaction processing performance of a database system such as an HTAP system or an HTASP system.

In a manner of obtaining a final analysis result by combining full calculation and incremental calculation, a single-layer calculation model can be converted into a two-layer real-time analysis model, which can adapt to an HTAP system or an HTASP system that is based on a full-state database, and can save calculation resources in the entire system.

In the foregoing embodiment, how an AP computing node generates a final analysis result for an analytical target transaction newly generated at a moment in the HTAP system or the HTASP system is generally described. In this embodiment of the present disclosure, the real-time analysis model and the streaming computing model are separately described in detail with reference to extension of a database command, association between a cold-hot level and full-state data, a storage model based on a cold-hot level, a visibility determining algorithm, and the like.

The following describes an extension manner of a database command in an HTAP system or an HTASP system that is established based on a full-state database.

(1.1) Command for Setting a Real-Time Degree Parameter

The real-time degree parameter is used for representing a maximum delay supported by data of analytical transaction processing in the database system. In other words, the database system may allow use of historical-state data how long ago for analysis. For example, if the real-time degree parameter is set to 1 hour, it indicates that the database system allows analysis by using historical-state data 1 hour ago.

The command for setting a real-time degree parameter enables the management user to determine, according to a service level agreement (SLA) requirement of the management user, a degree of online analytical performed on the current database (that is, the real-time degree parameter of the current database is set according to a requirement).

In one embodiment, a unit of the real-time degree parameter includes: second, minute, or hour. In addition, when the real-time degree parameter is set to 0, it indicates that a real-time analysis result is used, and a change of latest data of a current transaction system (that is, an OLTP cluster) needs to be sensed. If the management user does not set the real-time degree parameter, the real-time degree parameter may be configured as a default value for the current database. The default value is any numeric value greater than or equal to 0, for example, the default value is 1 s (second).

For example, the real-time degree parameter is represented by REAL_TIME_ANALYZING_DEGREE, and a command for viewing the real-time degree parameter of the current database is shown in the following code:

```
SHOW REAL_TIME_ANALYZING DEGREE ;
MySQL [test]> SHOW REAL_TIME_ANALYZING_DEGREE;
+------------------------------------------------------------------------------------------------
--+
| REAL_TIME_ANALYZING_DEGREE | memo
|
+------------------------------------------------------------------------------------------------
--+
| 1s | Allow 1 second latency between analyzing scan data with current
newest data version (allows 1s delay between analysis scan data and current latest data version)|
+------------------------------------------------------------------------------------------------
--+
1 row in set (0.00 sec)
```

The foregoing code shows the command for viewing the real-time degree parameter of the current database. It can be learned that the displayed real-time degree parameter that is currently set by the user is 1 second, and represents that the delay between the real-time granularity and latest data is 1 second, that is, the AP computing node (that is, the computing device) can perform online analytical from data of a historical version or a transitional version that has a difference of 1 second from the latest data.

For example, the real-time degree parameter is represented by REAL_TIME_ANALYZING_DEGREE, and a command for setting the real-time degree parameter of the current database is shown in the following code:
SET REAL_TIME_ALALYZING DEGREE=5 s;

The foregoing code shows the command for setting the real-time degree parameter of the current database. It can be learned that a meaning of the setting command is as follows: A data version that is delayed by 5 seconds from the latest data is allowed to be analyzed by the AP computing node.

The following is the test code for the setting command above:

```
MySQL [test]> SET_REAL_TIME_ANALYZING_DEGREE = 5s;
0 row in set (0.00 sec)
```

Generally, the management user does not set an excessively large real-time degree parameter. Therefore, a larger real-time degree parameter indicates a longer delay between the data version analyzed by the AP computing device and the latest version. Therefore, in this embodiment of the present disclosure, the real-time degree parameter in seconds is used as an example for description. However, the management user may modify a granularity to a minute unit, an hour unit, or the like according to an SLA requirement of the management user, and then the OLAP cluster determines all data versions required for this query.

(1.2) Command for Setting a Time Window Size

The time window size is: a specific step used by a streaming computing engine (or a streaming computing model) that runs on an AP computing node or a streaming computing node calculates an incremental analysis result.

In other words, a command for modifying the time window size is mainly used for adjusting a time window size of minimum division. The streaming computing engine starts calculation of division and an incremental analysis result of each data version in each time window according to the time window size.

In one embodiment, a unit of the time window size includes: second, minute, or hour. The user may customize a time window size. However, for the database engine, 1 second is used as a minimum time window unit, so that the time window size set by the user is divided into a plurality of second-level time window units. In other words, the time window size set by the user is an integer multiple of the minimum time window unit. If the management user does not set the time window size, the time window size may be configured as a default value for the current database. The default value is any numeric value greater than 0, for example, the default value is 1 s (second). When the time window size set by the management user is greater than the minimum time window unit of the system, the system divides data according to the minimum time window unit. However, the incremental analysis result is calculated only when the time window size specified by the management user is reached.

For example, if the time window size is represented by TIME_WINDOW, the command for viewing the time window size of the current database is SHOW TIME_WINDOW, as shown in the following code:

```
MySQL [test]> SHOW TIME_WINDOW;
+------------------------------------------------------------------------------------------------
--+
| REAL_TIME_ANALYZING DEGREE | memo
|
+------------------------------------------------------------------------------------------------
```

```
--+
| 5s | use time range as time window to divide different transaction into
different time window (use time windows to separate different transactions into different time
windows)|
   +-------------------------------------------------------------------------------------------
--+
   1 row in set (0.00 sec)
```

For example, if the time window size is represented by TIME_WINDOW, the command for setting the time window size of the current database is SET TIME_WINDOW, as shown in the following code:

```
MySQL [test]> Set TIME_WINDOW = 5s;
0 row in set (0.00 sec)
```

(1.3) Command for Setting a Calculation Period of a Full Analysis Result

The calculation period of the full analysis result is a calculation frequency of the full analysis result. The calculation period is used for defining a time interval for calculating the full analysis result in the streaming computing engine.

In one embodiment, the management user may define the calculation period of the full analysis result according to a service feature, and periodically initiate calculation of the full analysis result. The following case can be reduced: Each time a final analysis result is generated, too many incremental analysis results need to be combined in the middle because the full analysis result is too old, and therefore calculation performance is degraded. In other words, it can be ensured that each time a final analysis result is generated, an incremental analysis result that needs to be combined with a previous full analysis result is applicable to a service feature.

In one embodiment, a unit of the calculation period of the full analysis result includes: second, minute, or hour. The user may customize the calculation period of the full analysis result. However, for the database engine, 1 second is used as a minimum time window unit, so that the calculation period of the full analysis result that is set by the user is divided into a plurality of second-level time window units. In other words, the calculation period of the full analysis result that is set by the user is an integer multiple of the minimum time window unit. If the management user does not set the calculation period of the full analysis result, the calculation period of the full analysis result may be configured as a default value for the current database, where the default value is any numeric value greater than 0. For example, the default value is 1 minute, and the default value of the calculation period of the full analysis result is generally greater than the default value of the time window size of the incremental analysis result, because the system does not expect to frequently calculate the full analysis result. Certainly, the management user may adjust the set calculation period of the full analysis result according to a service status of the management user (currently, adjusting the default value is also supported). In one embodiment, the management user may further sense, according to a performance monitoring module, whether the current calculation period of the full analysis result causes a fluctuation in resource usage, so as to adapt to the adjustment of the calculation period of the full analysis result, that is, when the current system is relatively busy, increase the calculation period of the full analysis result, that is, reduce the calculation frequency of the full analysis result; or when the current system is relatively idle, decrease the calculation period of the full analysis result, that is, increase the calculation frequency of the full analysis result. When the calculation period of the full analysis result set by the management user is greater than the minimum time window unit of the system, the system divides data according to the minimum time window unit. However, calculation of the full analysis result is performed only when the calculation period of the full analysis result specified by the management user is reached.

For example, FULL_ANALAZY_RESULT_PERIOD is used for representing the calculation period of the full analysis result, and the command for viewing the calculation period of the full analysis result in the current database is SHOW FULL_ANALAZY_RESULT_PERIOD, as shown in the following code:

```
MySQL [test]> SHOW FULL_ANALAZY_RESULT_PERIOD;
   +-------------------------------------------------------------------------------------------
--+
| REAL TIME ANALYZING DEGREE | memo
|

+-------------------------------------------------------------------------------------------
--+
| 5s | use time range as time window to divide different transaction into
different time window (use time windows to separate different transactions into different time
windows)|
   +-------------------------------------------------------------------------------------------
--+
   1 row in set (0.00 sec)
```

For example, FULL_ANALAZY_RESULT_PERIOD is used for representing the calculation period of the full analysis result, and the command for setting the calculation period of the full analysis result in the current database is SET FULL_ANALAZY_RESULT_PERIOD, as shown in the following code:

```
   MySQL [test]>
   Set FULL_ANALAZY_RESULT_PERIOD = 1m; set the
   calculation period of the full analysis result to 1 minute;
       0 row in set (0.00 sec)
```

(1.4) Command for Setting a Classification Standard of a Cold-Hot Level

The cold-hot level is used for representing a frequency of performing an operation on historical-state data in a historical time period. Because the operation includes but is not limited to a read operation, that is, a query or access operation, and a write operation, that is, a modify or update operation, the cold-hot level of the historical-state data of each version may be comprehensively determined based on a quantity of access times of the historical-state data in the historical time period and a quantity of modification times of current-state data corresponding to the historical-state data.

In one embodiment, the management user may define the classification standard of the cold-hot level based on a service system status of the management user, to be specific, the management user defines which data to be classified into which cold-hot level. In an example, the following several types of cold-hot levels are included in descending order of operation frequencies: hot data, warm data, cold data, and archived data. A classification standard of each cold-hot level is set, full-state data is partitioned according to the cold-hot level, and data with the same cold-hot level is divided into storage devices in the same partition for storage, or data with the same cold-hot level is divided into storage media of storage devices in the same partition for storage, so as to achieve a best database use effect and lowest database use costs.

For example, HOT_COLD_DATA_LEVEL is used for representing the classification standard of the cold-hot level. The command for viewing the classification standard of the cold-hot level of the current database is SHOW HOT_COLD_DATA_LEVEL, which means that when a quantity of access times of data in a state in a specified time period is less than a specified value, the data is dumped to a storage device or a storage medium of a next level, as shown in the following code:

Based on the foregoing example, it can be learned that the management user can specify the classification standard of the cold-hot level from two dimensions. To be specific, whether a current data record needs to be dumped to a storage device or a storage medium of a next level is determined based on a quantity of modification times and/or access times of a data record in a specific period (for example, several hours, one day, one week, one month, one year, or the like, with 1 second being the minimum).

For example, HOT_COLD_DATA_LEVEL is used for representing the classification standard of the cold-hot level, and the command for setting the classification standard of the cold-hot level of the current database is SET HOT_COLD_DATA_LEVEL; which is used by the management user to customize a dumping standard according to the service requirement of the management user.

In an example scenario, the classification standard of the cold-hot level may be modified based on the foregoing format. A detailed command is omitted. If the management user does not set the classification standard of the cold-hot level, a default classification standard of the cold-hot level may be provided. For example, four cold-hot levels are divided in the following manner: Hot data (data that is frequently modified in one day, for example, a quantity of modification times in one day is greater than 100 times), warm data (data that is generally modified moderately in one month but is accessed, for example, 10 times <a quantity of modification times in one month <50 times, and a quantity of access times in one month >50 times), cold data (data that is not modified in one year but is accessed, for example, a quantity of access times in one year <10 times), and archived data (data that is not accessed more than one year). The default classification standard of the cold-hot level may also be modified by the management user. This is not specifically limited in this embodiment of the present disclosure.

All the foregoing commands (1.1) to (1.4) can be defined in a database start parameter configuration file. In addition, during running of the database, the management user can set a more proper value according to a service feature and an actual resource status. All the foregoing parameters are

```
   +---------------------------------------------------------------------------------------------
--+
   | REAL_TIME_ANALYZING DEGREE.                         | memo
   |
   +---------------------------------------------------------------------------------------------
--+
   |
   {{                                                    |
   |
   | { hot_data, 1 day },                    | data in a day is hot data. |
   | { change_times, 100 },                  | quantity of data modifications in a day.
   |
   | { access_times, 100 },                  | quantity of access times of data in a
day. |
   | { storage_path, "/data/ssd_disk/" },     | Data that meets the above
conditions will be stored in this path. Different-speed devices are corresponded by using the
directory path. |
   | }
   |
   |
   | ... | Other levels of data, whose format definitions are consistent with the
above hot data description and are not enumerated one by one. |
   +---------------------------------------------------------------------------------------------
--+
   1 row in set (0.00 sec)
``` adjusted dynamically manually or adaptively by the system, and the database service does not need to be stopped.

The following describes an association relationship between historical-state data and cold, warm, and hot data in a possible classification standard of the cold-hot level.

Figure 5:
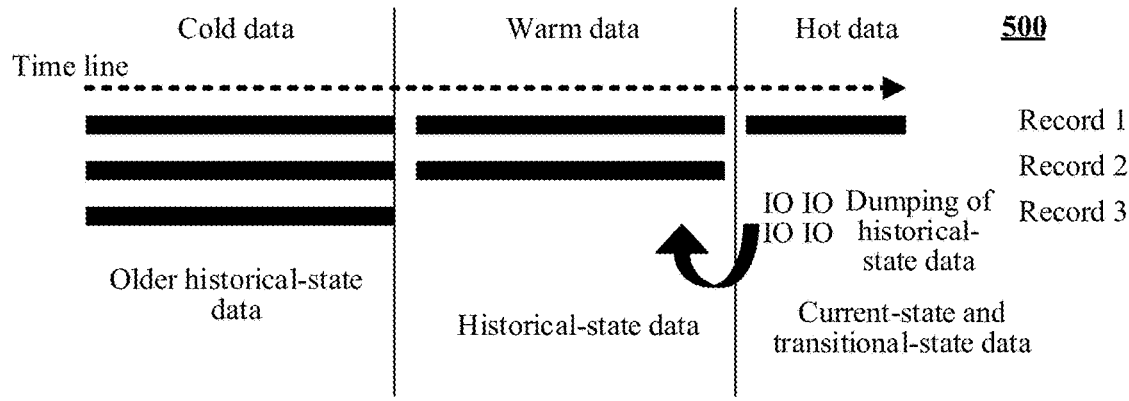
FIG. 5 is a schematic diagram of a relationship between historical-state data and cold, hot, and warm data according to an embodiment of the present disclosure.

FIG. 5 is a schematic diagram of a relationship between historical-state data and cold, hot, and warm data according to an embodiment of the present disclosure. As shown in 500, because a classification standard of the cold-hot level is measured by using a quantity of access times and/or a quantity of modification times that occur in a target time period, a correspondence between historical-state data, cold data, and warm data is naturally implemented in a full-state database. That is, because the hot data refers to a data record that is frequently modified in a short term (for example, one day), it indicates that the hot data is corresponding to current-state data and transitional-state data, and the cold data and the warm data are almost not modified and are only accessible relative to each other. Therefore, the warm data is corresponding to historical-state data, and the cold data is corresponding to older historical-state data.

In one embodiment, over time, transitional-state data is also dumped as historical-state data. For example, the full-state database periodically starts a dumping algorithm, and dumps the transitional-state data from a storage device corresponding to the hot data to a storage device corresponding to the warm data (used for storing historical-state data). After dumping of the transitional-state data is completed, the storage device corresponding to the hot data may directly discard the dumped transitional-state data, so as to save more storage space.

In one embodiment, both the current-state data and the transitional-state data are corresponding to hot data. For historical-state data, a plurality of cold-hot levels may be defined based on a user characteristic, to meet a service-specific requirement of the user. For example, the historical-state data is classified into three cold-hot levels: warm data, cold data, and archived data. Once any data is dumped into historical-state data, the data is changed to read-only data, that is, the system does not allow modification of the historical-state data, that is, tampering of the historical-state data is prevented, so as to protect security of the historical-state data.

In one embodiment, the current-state data and the transitional-state data that are modified at a relatively high frequency may be corresponding to the hot data, the current-state data and the transitional-state data that are modified at a relatively low frequency may be corresponding to the warm data, and the historical-state data is divided into cold data and archived data. FIG. 5 merely provides an association relationship between full-state data and data at a cold-hot level, but is not limited to the association relationship shown in FIG. 5.

In one embodiment, both the current-state data and the transitional-state data are corresponding to a currently active data record. When the data record is continuously modified, a data record of a latest version is continuously generated. When a data record is continuously not modified or accessed in a time period (a target time period), the data is dumped into historical-state data (for example, cold data). If the data is still continuously not accessed at a level of cold data, the data record is dumped into colder data (for example, archived data) because latest historical-state data is continuously aged.

In one embodiment, one piece of modification mark information is added to all current-state data in the full-state database to count a quantity of modification times. In addition, one piece of access mark information is added to all current-state data, transitional-state data, and historical-state data to count a quantity of access times, so that it can be conveniently determined whether each data record needs to be dumped to a next-level storage device.

The following describes a principle of applying data state transition to a master-slave copy mechanism in an HTAP or HTASP system.

Figure 6:
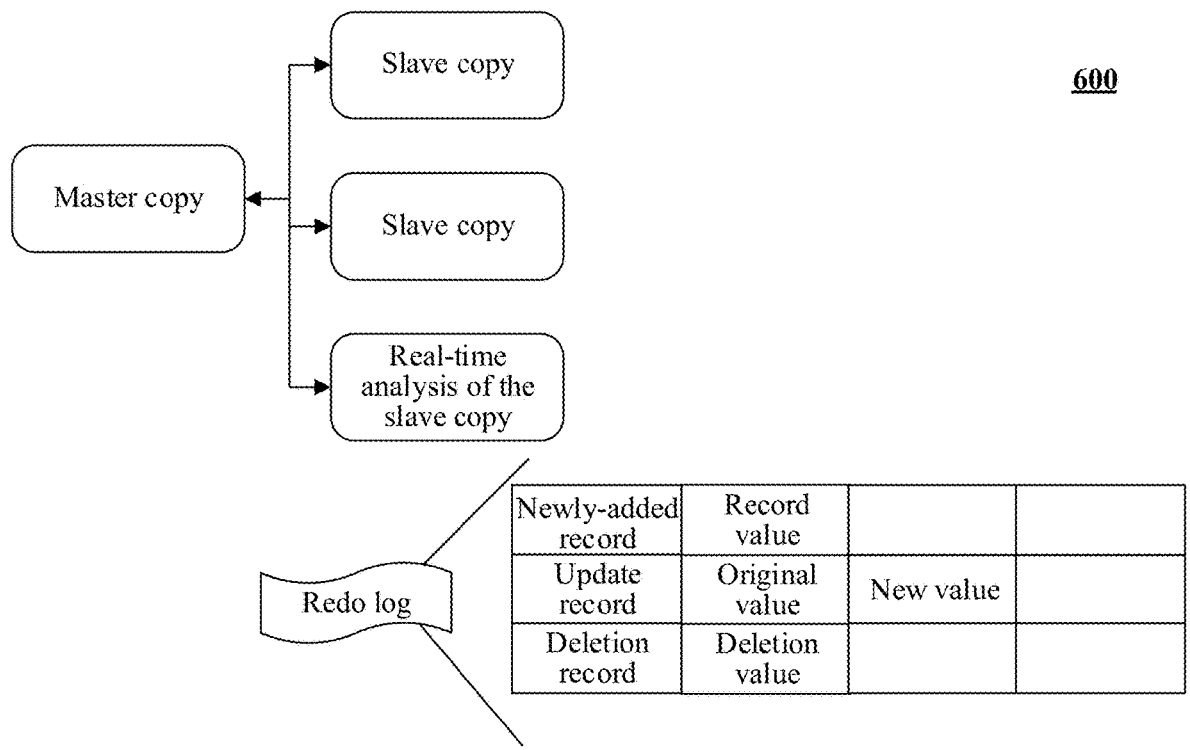
FIG. 6 is a schematic diagram of a principle of adding a slave copy for real-time analysis in a master-slave copy mechanism according to an embodiment of the present disclosure.

FIG. 6 is a schematic diagram of a principle of adding a slave copy for real-time analysis in a master-slave copy mechanism according to an embodiment of the present disclosure. As shown in FIG. 600, in a storage cluster (that is, a storage engine) of a distributed system, to prevent all data on a storage device from being unavailable due to a failure of the storage device, the master-slave copy mechanism is usually introduced, that is, at least one slave copy is stored for each piece of data (that is, the master copy), so as to ensure that a related data service can still be provided on the slave copy even if the master copy breaks down. In this embodiment of the present disclosure, a one-master two-slave mechanism is used as an example. Each master copy stores two slave copies, and data consistency between the master copy and the slave copies is ensured by using a consistency protocol such as Paxos or Raft, so as to improve data reliability of an entire storage cluster. In a consistency protocol such as Paxos or Raft, a data record in a data table is divided into relatively small management units, for example, a data block, a data region, and a data page. This is not specifically limited in this embodiment of the present disclosure.

However, in this embodiment of the present disclosure, a real-time analysis slave copy is additionally introduced into each group of master and slave copies of the storage cluster. The master and slave copies read and write data according to a conventional manner, and write related data to a storage device corresponding to hot data. The real-time analysis slave copy is only responsible for data synchronization, but does not participate in an election procedure of the master copy. This is because some consistency protocols may periodically re-elect a master copy, and the real-time analysis slave copy does not participate in any voting procedure under the consistency protocol (that is, the real-time analysis slave copy does not participate in most voting procedures under the consistency protocol).

A node device on which the real-time analysis slave copy is located is configured to provide a function of dumping historical-state data. In other words, the function of dumping the historical-state data can be migrated from the master copy to the real-time analysis slave copy. In this way, calculation pressure of the node device on which the master copy is located can be subtracted, so that mutual impact between the OLTP cluster and the OLAP cluster is completely decoupled.

In one embodiment, there may be a relatively large delay between the slave copy and the master copy or two other slave copies in real time. Log chasing is performed by using the consistent protocol, so that the slave copy can finally obtain all data of all versions in the master copy in real time, and interference to a current OLTP cluster is lowest.

In one embodiment, the real-time analysis slave copy does not necessarily pull data from the master copy each time, but may select a most favorable copy (for example, the idlest copy) according to respective busy/idle states of the master copy and the slave copy to perform synchronization, so as to minimize impact of a synchronization task of the real-time analysis copy on the OLTP cluster.

In one embodiment, after some data whose access frequency or modification frequency is relatively low is dumped into historical-state data by analyzing a slave copy in real time, dumped data may be periodically cleaned up (the master copy and another salve copy may also be synchronously cleaned up). For example, data whose quantity of modification times is less than 50 times and whose quantity of access times is less than 100 times in one day is dumped into the storage device corresponding to the historical-state data, and then the dumped data is directly deleted.

The following describes a storage model of cold and hot data in an embodiment of the present disclosure.

Figure 7:
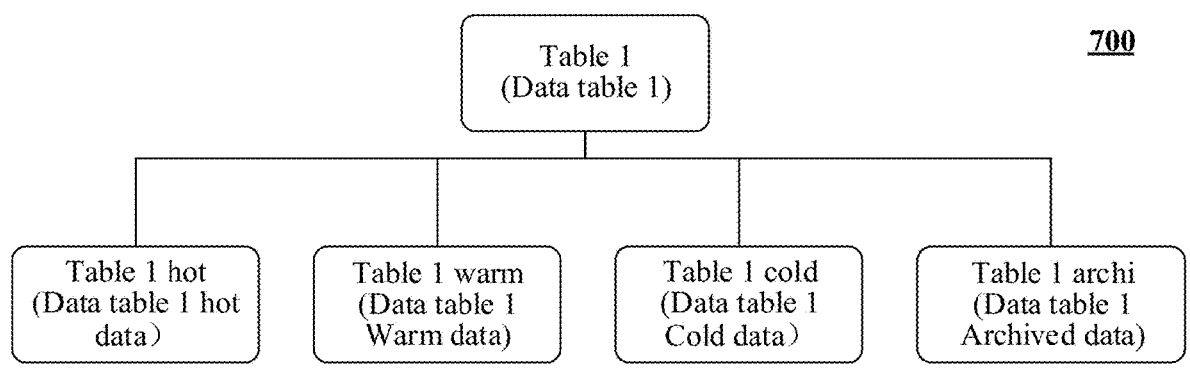
FIG. 7 is a schematic diagram of a principle of a storage model of cold and hot data according to an embodiment of the present disclosure.

FIG. 7 is a schematic diagram of a principle of a storage model of cold and hot data according to an embodiment of the present disclosure. As shown in FIG. 700, because the foregoing description, for a data table in a full-state database, the parameter classification standard HOT_COLD_DATA_LEVEL of the cold-hot level is added. The following describes how to store corresponding data based on four cold-hot levels: hot data, warm data, cold data, and archived data as an example.

In a parameter initialization phase, the management user may use the related commands provided in (1.4) above to set respective classification standards of hot data, warm data, cold data, and archived data according to service characteristics during cluster establishment. This embodiment of the present disclosure is not limited to being classified into four levels, and the classification standard of each level is not limited. The management user may classify it into any quantity of levels, and set any classification standard.

In one embodiment, on the basis that the classification standard of the cold-hot level is set, when a data table is subsequently created, the system automatically partitions the data table according to a cold-hot level of data, and divides the data table into a storage device in a corresponding partition for storage. In addition, a background thread of the storage device also periodically determines whether the cold-hot level of the data changes. When the cold-hot level changes, the data needs to be dumped to another storage device in a corresponding partition.

In one embodiment, when it is determined whether a cold-hot level of data changes, background storage processing tasks for data stored in different partitions are separately started according to different classification standards. For example, all data stored in each partition is scanned, and it is determined whether each version of a data record meets a condition for dumping to a next storage level. If the dumping condition is met, data records of all the versions that meet the condition need to be moved to a corresponding storage partition. Full-state data retains all versions of all data records, and a historical version is not modifiable. Data records of a historical version are gradually migrated from a hot data partition to a warm data partition and a cold data partition, and finally are migrated to an archived data partition (the data is only stored but usually cannot be accessed).

In one embodiment, when the system runs, the management user may change the classification standard of the cold-hot level at any time or the system automatically and dynamically adjusts the classification standard of the cold-hot level without a need to shut down. When the classification standard of the cold-hot level changes, the background thread of the storage device adjusts a partition status of the storage device according to a load status. For example, when a partition is added, a corresponding new partition is first added, and then data of an adjacent partition is adjusted.

For another example, when a partition is reduced, although one existing partition is reduced, data stored in the reduced partition is not deleted. Therefore, data in the deleted partition needs to be migrated to an adjacent partition before the specified partition is deleted. For another example, when a partition is modified, the background thread migrates data that does not meet the classification standard of the current partition to the adjacent partition. For example, the background thread modifies the classification standard of the warm data partition from a case in which a quantity of access times is less than 100 to a case in which a quantity of access times is less than 90. In this case, data that is in the warm data partition and whose original quantity of access times is between 90-100 needs to be migrated to the hot data partition.

The following describes a visibility determining algorithm of a data record.

Because a time dimension is introduced to each data record in the full-state database, the query calculation model of the computing device in the OLAP cluster also needs to be reconstructed, to provide a real-time analysis and computing capability with high efficiency and low resource usage in this embodiment of the present disclosure, and support provision of a basic query execution model of a streaming computing engine based on a time window granularity.

A data service generally provided by a relational database is converted into processing of an SQL statement submitted by a user. Because historical-state data cannot be modified or deleted and is read-only, the calculation statement in this embodiment of the present disclosure is only a query (Select) statement, and other addition/deletion/modification statements need only be implemented according to the semantics of data extraction in the SQL: 2011 temporal standard. Therefore, because the Select statement definitely relates to determining the visibility of the data record, the following describes a visibility determining algorithm of a data record.

Figure 8:
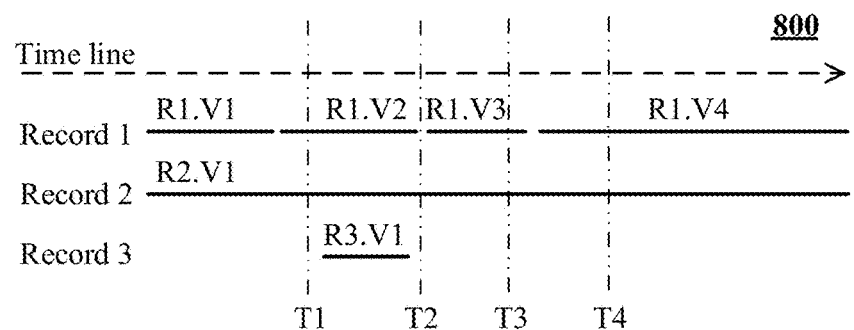
FIG. 8 is a schematic diagram of a storage form of a full-state data record according to an embodiment of the present disclosure.

FIG. 8 is a schematic diagram of a storage form of a full-state data record according to an embodiment of the present disclosure. As shown in 800, a horizontal axis represents a time axis, and represents time passing from left to right. A record 1, a record 2, and a record 3 that are stored in a database are used as examples to describe visible versions of records at four moments T1-T4.

Record 1 (Record 1, R1): R1 is inserted into the database on the leftmost side of the time line. The inserted version at the time of insertion is V1, and R1 is modified at a moment before T1. The first line segment represents a life cycle of R1.V1 (V1 version of R1), and the life cycle represents a valid time of a corresponding version. The valid time may be determined based on a valid time defined by a user, or may be determined based on a transaction time of data. The next three segment distribution represents the respective life cycles of R1.V2, R1.V3, and R1.V4.

It can be learned from analysis that, at the moment T1, the visible version of R1 is V2. At a moment T2, the V2 version ends. Because of time continuity, a left end value of a life cycle of the V3 version is equal to a right end value of the life cycle of the V2 version. Therefore, at the moment T2, the visible version of R1 is V3. At a moment T3, it is still in the life cycle of V3, and therefore the visible version of R1 is V3. At the moment T4, it is in a life cycle of V4, and therefore the visible version of R1 is V4.

Record 2 (Record 2, R2): R2 appears as a radial line on the entire time line, indicating that R2 has been inserted into the database on the leftmost side of the time line, has not been modified, and is always in the R2.V1 version.

Analysis shows that the visible version of R2 is V1 at the moments T1, T2, T3, and T4.

Record 3 (Record 3, R3): R3 is inserted into the database after the moment T1. Therefore, R3 is not inserted at the moment T1, and is invisible at the moment T1. Then, R3 is deleted at a moment between the moment T1 and the moment T2. Therefore, R3 is deleted after the moment T2, and is also invisible after the moment T2.

Analysis shows that R3 is invisible at the moments T1, T2, T3, and T4.

In some embodiments, a life cycle of each version of the data record is identified by using a left-closed right-open time interval. For example, R1.V1 [2020-08-09 12:30:30, 2020-08-19 22:15:30) indicates that the record R1 is inserted at 2020-08-09 12:30:30, and is invalid at 2020-08-19 22:15:30.

The following describes a data visibility determining algorithm at a single moment (that is, a time point):

At the moment T1, it is assumed that data is scanned by a query transaction. For the query transaction, visible data records are R1.V2 and R2.V1 at the moment T1. Because the record R3 is not inserted at the moment T1, the record R3 does not exist and is certainly invisible.

At the moment T2, it is assumed that data is scanned by a query transaction. For the query transaction, visible data records are R1.V3 and R2.V1 at the moment T2. Because the record R3 has been deleted before the moment T2, the record R3 data does not exist and is certainly invisible. Because the life cycle of each version of the data record has a left-open right-closed interval attribute, R1.V3 is visible at the moment T2.

At the moment T3, it is assumed that data is scanned by a query transaction. For the query transaction, visible data records are R1.V3 and R2.V1 at the moment T3, and the record R3 has been deleted and is therefore invisible.

At the moment T4, it is assumed that data is scanned by a query transaction. For the query transaction, visible data records are R1.V4 and R2.V1 at the moment T4, and the record R3 has been deleted and is therefore invisible.

According to the data visibility determining algorithm at a single moment, it can be learned that a query transaction at each time point can see only one version of a data record. However, some query transactions are not initiated for the time point, but a query time period may be specified. Therefore, the following describes a data visibility determining algorithm in a time period (that is, a query time period).

It is assumed that a query time period is divided into the following four consecutive time periods: [min_time, T1), [T1, T3), [T3, T2), and [T2, current_time]. If a query transaction specifies a query time period (or referred to as a valid time interval, a transaction time interval, or the like), for the query time period, a visibility determining algorithm of a data record is as follows:

For example, it is assumed that a SELECT Query statement of the query transaction is:
 select sum(a) from T1 FOR SYSTEM_TIME FROM time1 TO time2 where a>1;
 where time1 refers to the left end value (that is, min_time) of the query time period, and time2 refers to the right end value (that is, current_time) of the query time period.

For a single time period, a visibility determining algorithm is expressed as: determining the right end value of the single time period, and determining, on the right end value of the single time period according to a data visibility determining algorithm at the single moment, a data version visible relative to the single time period.

When a single time period is split into a combination of a plurality of time periods, for example, a single time period [min_time, current_time] is split into four time periods: [min_time, T1), [T1, T3), [T3, T2), and [T2, current_time], that is, [min_time, current_time]→[min_time, T1), [T1, T3), [T3, T2), [T2, current_time].

In this case, for the leftmost time period in the plurality of time periods, a visible data version is determined according to a visibility determining algorithm of the single time period. For the rightmost time period in the plurality of time periods, a latest visible record version value of each data record is found, the leftmost record version value of the data record is found, and then a correction algorithm of a multi-level query result is performed on the data records of the two versions, so as to ensure correctness of the query result. In response to that the rightmost time period is a left-closed right-open interval, if a version seen in the foregoing rightmost time period is consistent with a version seen in the foregoing leftmost time period, the current data record is skipped, and it is considered that the current data record is invisible. In response to that the rightmost time period is a closed interval, a visible version under the right end value of the rightmost time period is used as a visible value of the current record.

Based on support of the foregoing related content, how the computing device in the OLAP cluster in the HTAP system or the HTASP system provides efficient real-time analysis performance based on the real-time analysis model is described in detail in this embodiment of the present disclosure.

Figure 9:
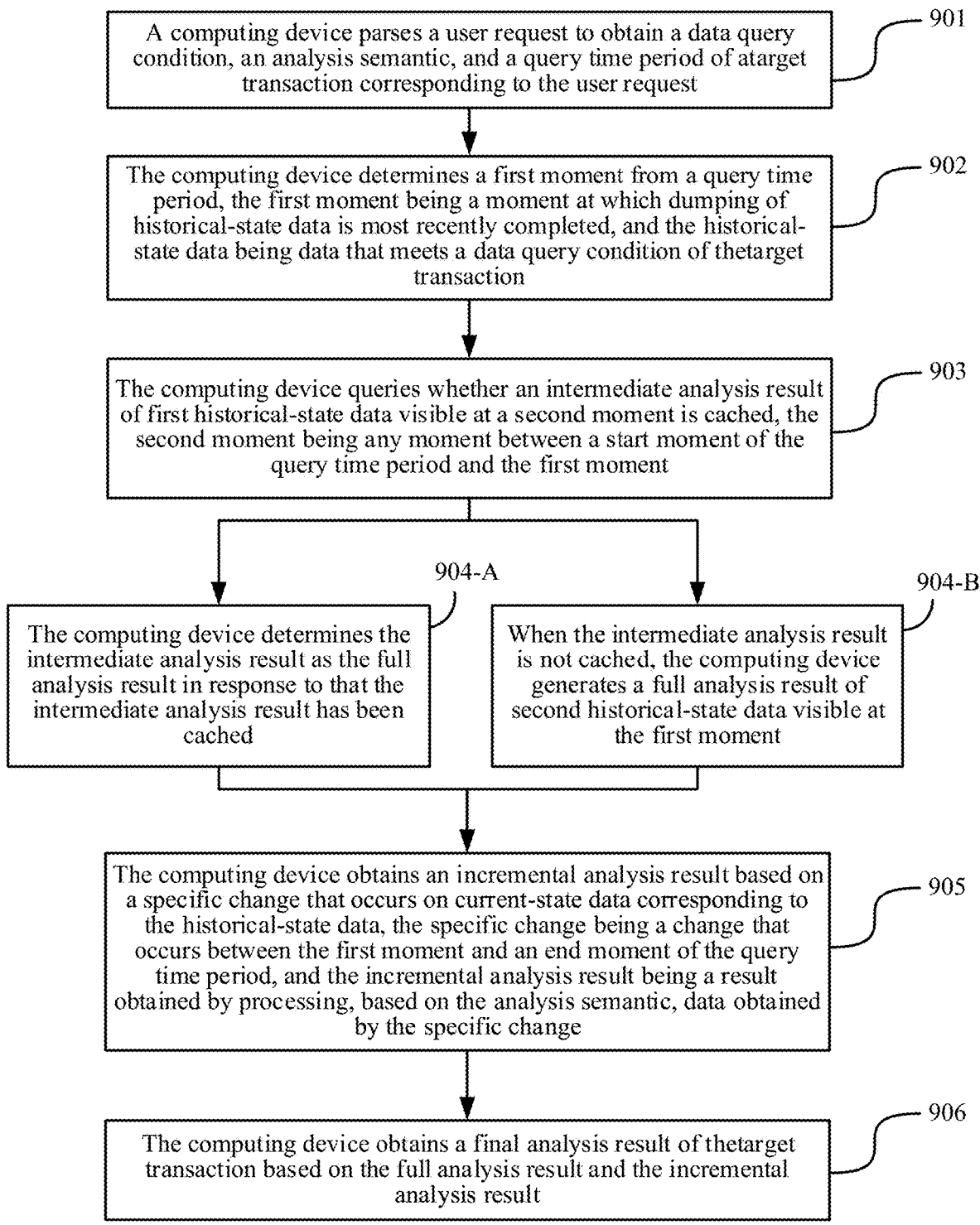
FIG. 9 is a flowchart of a transaction processing method according to an embodiment of the present disclosure.

FIG. 9 is a flowchart of a transaction processing method according to an embodiment of the present disclosure. Referring to FIG. 9, this embodiment is applicable to a data processing system that supports real-time analysis, such as an HTAP system, an HTASP system, or a blockchain system. The transaction processing method is performed by any computing device in an OLAP cluster. This embodiment includes the following steps.

901. The computing device parses a user request to obtain a data query condition, an analysis semantic, and a query time period of a target transaction corresponding to the user request.

In some embodiments, the computing device receives any user request from the application client, parses a header field of the user request, and when the header field indicates that the user request is an analytical transaction, parses a data field of the user request to obtain an SQL statement (for example, a SELECT Query statement) carried in the user request, and sends the SQL statement to the query parser. The query parser performs lexical analysis, syntax analysis, temporal translation, and semantic check on the SQL statement to obtain a data query condition and analytic semantics (for example, summation, averaging, and sorting) of the SQL statement. In addition, if a start moment of the query time period is specified in the SQL statement, the start moment is obtained; or if an end moment of the query time period is specified in the SQL statement, the end moment is obtained. Then, a corresponding target transaction is constructed based on the SQL statement. The computing device creates a process or a thread for the target transaction, or reuses a created process or thread, and processes the target transaction by using the process or the thread.

For example, when the start moment of the query time period is specified for the target transaction, the start moment specified for the target transaction is used. When the start moment of the query time period is not specified for the target transaction, an effective moment of a latest version of the data queried by the target transaction is used, that is, the effective moment of the latest version of the data that meets the data query condition is determined as the start moment. When a plurality of pieces of data need to be queried, a corresponding visible version is selected based on an effective moment of a latest version of each piece of data for analysis. An effective moment of an inserted version of data queried by a target transaction is used, that is, the effective moment of the inserted version of data that meets the data query condition is determined as the start moment. When a plurality of pieces of data are queried, a corresponding visible version is selected based on an effective moment at which a version is inserted into each piece of data for analysis. A manner of determining the start moment is not specifically limited in this embodiment of the present disclosure.

Schematically, when the target transaction specifies the end moment of the query time period, the end moment specified by the target transaction is used. When the target transaction does not specify the end moment of the query time period, the real-time degree parameter in the database system is obtained. The real-time degree parameter is used for representing a maximum delay supported by data of analytical transaction processing in the database system. In other words, the database system may allow use of historical-state data how long ago for analysis. For example, if the real-time degree parameter is set to 1 hour, it indicates that the database system allows analysis by using historical-state data 1 hour ago. In one embodiment, the real-time degree parameter is customized by a management user. If the management user has not set the real-time degree parameter, a default value (for example, 1 second) of the database system is used. The default value may also be modified. This is not specifically limited in this embodiment of the present disclosure. After the real-time degree parameter is obtained, the end moment is determined based on the real-time degree parameter. In some embodiments, a moment before a current moment and whose distance to the current moment reaches the real-time degree parameter is determined as the end moment. A manner of determining the end moment is not specifically limited in this embodiment of the present disclosure.

After the start moment and the end moment are determined based on the foregoing manner, a query time period from the start moment to the end moment may be obtained. The query time period is a closed interval, that is, the query time period includes both the start moment of the left endpoint and the end moment of the right endpoint; or the query time period is a left-closed right-open time interval, that is, the query time period includes the start moment of the left endpoint but does not include the end moment of the right endpoint. A feature of a left-closed right-open time interval is as follows: For the start moment, data that is effective at the start moment is visible, and for the end moment, data that is effective at the end moment is invisible. This is used for determining visibility of auxiliary data. The user may specify whether the query time period includes the end moment of the right endpoint. If the query time period includes the end moment, the query time period is a closed interval. If the query time period does not include the end moment, the query time period is a left-closed right-open time interval. If the user does not specify whether the query time period includes the end moment, the query time period may include the end moment by default, that is, the query time period is a closed interval by default.

902. The computing device determines a first moment from a query time period, the first moment being a moment at which a most recent dumping of historical-state data is completed, and the historical-state data being data that meets a data query condition of the target transaction.

In some embodiments, after the computing device determines the query time period and the data query condition, because the OLTP cluster periodically migrates the historical-state data generated by the transactional transaction of the OLTP cluster to the storage device in the storage cluster for persistent storage, the foregoing process of migrating the historical-state data is a process of dumping the historical-state data. A related record is usually generated each time dumping is performed. For example, a checkpoint of a log synchronized last time is recorded, specific historical-state data that is dumped at this time is recorded in a meta information manager of the storage cluster, or a table is specially maintained to record a completion time of each dumping. Therefore, it is easy to find a moment (that is, the first moment) at which most recent dumping of all historical-state data that meets the data query condition of the target transaction is completed.

In the foregoing process of dumping the historical-state data, the slave copy may be analyzed in real time based on the master-slave copy mechanism added in the foregoing embodiment, so that impact of the historical-state data dumping task on transaction performance in the OLTP cluster can be reduced.

903. The computing device queries whether an intermediate analysis result of first historical-state data visible at a second moment is cached, the second moment being any moment between a start moment of the query time period and the first moment.

In some embodiments, the first moment is used as a boundary. The query time period may be divided into two subintervals: a first subinterval [start moment, first moment) from the start moment to the first moment and a second subinterval [first moment, end moment] from the first moment to the end moment. A full analysis result of the first subinterval and an incremental analysis result of the second subinterval are combined to obtain the final analysis result. In other words, analysis work in one query time period is divided into analysis work in two subintervals (that is, two time periods). In this embodiment of the present disclosure, an example in which the second subinterval is a closed interval is used for description. However, the user may specify whether the query time period includes the end moment of the right endpoint value. If the query time period includes the end moment, the second subinterval is a closed interval. If the query time period does not include the end moment, the second subinterval is a left-closed right-open interval. If the user does not specify whether the query time period includes the end moment, the query time period may include the end moment by default, that is, the second subinterval is a closed interval by default.

In some embodiments, because the intermediate analysis result at the second moment between the start moment and the first moment may be cached in the database system, if the query time period is divided into more than two time periods according to a visibility determining algorithm, a visible version of a data record can be determined only by examining the leftmost time period and the rightmost time period, so as to perform analysis and processing on the visible version. Therefore, if the first moment and the second moment are used as boundaries, the query time period is divided into three subintervals: [start moment, second moment), [second moment, first moment), and [first moment, end moment]. The final analysis result can be obtained by only combining a cached intermediate analysis result of [start moment, second moment) and an incremental analysis result of the second subinterval [first moment, end moment], that is, the full analysis result at the first moment does not need to be repeatedly calculated.

In some embodiments, when querying the intermediate analysis result, the computing device determines, according to a data query condition of a target transaction, whether previous historical transactions have been analyzed for the same data query condition, and if the data query condition of any previous historical transaction is missed, performs the following step 904-B. If a data query condition of any previous historical transaction is hit, a hit transaction identification (ID) of the historical transaction is used as an index in a cache region to query whether a full analysis result corresponding to the index is cached. If any cached full analysis result is hit, the hit full analysis result is determined as the intermediate analysis result, and the following step 904-A is performed. If all cached full analysis results are missed, it is determined that the intermediate analysis result is not cached, and the following step 904-B is performed.

In some embodiments, after it is queried whether an intermediate analysis result of first historical-state data visible at the second moment is cached, the following step 904-A is performed when the intermediate analysis result is cached. In response to that the intermediate analysis result is not cached, the following step 904-B is performed.

In the foregoing process, whether the intermediate analysis result is cached is determined, so as to avoid repeatedly calculating the full analysis result at the first moment when the intermediate analysis result is cached. Therefore, computing resources of the computing device can be greatly saved.

904-A. The computing device determines the intermediate analysis result as the full analysis result in response to that the intermediate analysis result has been cached.

That is, if the intermediate analysis result of any second moment from the start moment to the first moment is cached, the intermediate analysis result is directly used as the full analysis result, and redundant calculation does not need to be performed on the full analysis result, so that computing resources of the computing device can be greatly saved.

904-B. When the intermediate analysis result is not cached, the computing device generates a full analysis result of second historical-state data visible at the first moment.

In some embodiments, if the intermediate analysis result is not cached, the computing device needs to determine, from the historical-state data by using a visibility determining algorithm at a single moment, the second historical-state data that is visible at the first subinterval [start moment, first moment). In other words, the computing device executes a visibility determining algorithm at a single moment only for the first moment of the right end value of the first subinterval [start moment, first moment), so as to determine the second historical-state data.

After the second historical-state data is determined from historical-state data of various versions, processing corresponding to analysis semantic is performed on the second historical-state data based on the analysis semantic obtained by parsing in step 901, to obtain the full analysis result. For example, if the analysis semantic is averaging a value of a field, the value of the field corresponding to each piece of second historical-state data needs to be averaged. For another example, if the analysis semantic is summing a value of a field, the value of the field corresponding to each piece of second historical-state data needs to be added to obtain a sum value obtained by means of adding.

In the foregoing steps 903-904A or 904B, the computing device obtains the full analysis result based on the historical-state data, where the full analysis result is a result obtained by processing the historical-state data based on the analysis semantic of the target transaction, so that the full analysis result in step 904-A or 904-B can be combined with the incremental analysis result in the following step 905 to obtain the final analysis result, that is, a single-layer computing model is converted into a full+incremental dual-layer computing model.

In some embodiments, a storage cluster of the HTAP system or the HTASP system may be divided into corresponding partitions according to a classification standard of a cold-hot level, and a storage device in each partition stores historical-state data corresponding to the cold-hot level. In other words, historical-state data of different cold-hot levels is stored in different storage devices or different storage media of a same storage device. Therefore, when reading the second historical-state data, the computing device first determines a cold-hot level of the second historical-state data, the cold-hot level representing a frequency of an operation performed on the second historical-state data in a historical time period; and then reads the second historical-state data from a storage device corresponding to the cold-hot level.

In some embodiments, when determining the cold-hot level of the second historical-state data, the computing device obtains a quantity of access times of the second historical-state data in the historical time period, obtains a quantity of modification times of current-state data corresponding to the second historical-state data in the historical time period, and determines the cold-hot level based on the quantity of access times and the quantity of modification times. The historical time period refers to a time period (for example, one day, one month, or one year) that needs to be determined in the classification standard of the cold-hot level in the current database and that is set by a management user.

In one embodiment, when the classification standard of the cold-hot level is described, one piece of modification mark information is added to all current-state data in the full-state database to count the quantity of modification times. In addition, one piece of access mark information is added to all current-state data, transitional-state data, and historical-state data to count the quantity of access times. Therefore, the quantity of modification times can be obtained by querying each piece of second historical-state data (actually, a visible version of the historical-state data at the first moment) that is of the current-state data and that is corresponding to the second historical-state data, and the quantity of access times can be obtained by querying access mark information of the second historical-state data.

In one embodiment, after the quantity of access times and the quantity of modification times are obtained, the cold-hot level of the second historical-state data may be determined by viewing, based on the classification standard of the cold-hot level of the current database, a value range within which the quantity of access times and the quantity of modification times fall in the classification standard of the cold-hot level.

905. The computing device obtains an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change.

Because the first moment is a moment at which the corresponding historical-state data is most recently dumped, it indicates that data between the first moment and the end moment has not been dumped from the OLTP cluster to the storage cluster. Therefore, the log generated due to the specific change needs to be first obtained from the OLTP cluster, and the log generated due to the specific change is played back to obtain the data obtained due to the specific change. Then, historical-state data with a same primary key identifier and the data obtained due to the specific change are compared, and a comparison result is processed according to analysis semantics of the SQL statement of the target transaction, to generate the incremental analysis result. The incremental analysis result represents only a change between the incremental analysis result and a previous full analysis result, and is not a full analysis result obtained by means of new calculation.

In the foregoing process, only the incremental analysis result is obtained by using data obtained due to the specific change, and the full analysis result does not need to be obtained. Because an amount of data that needs to be analyzed for the incremental analysis result is relatively small, and a time consumed is relatively small, calculation overheads and processing resources of the computing device can be greatly reduced.

In some embodiments, the incremental analysis result includes an analysis result before the specific change and an analysis result after the specific change. When comparing the historical-state data whose primary key identifier is the same with the data obtained after the specific change, the computing device needs to first determine, for the historical-state data whose primary key identifier is the same as the data obtained after the specific change, a field in which the specific change occurs. The historical-state data that has the same primary key identifier and the data obtained after the specific change herein refer to different versions generated when the specific change is performed on the data record that has the primary key identifier at different moments. For example, the field in which the specific change occurs is determined for a historical state V1 version of R1 and a V4 version obtained after a latest specific change.

On a basis of determining the field in which the specific change occurs, if the data query condition does not involve the field in which the specific change occurs, it indicates that the field queried by the target transaction does not change, and therefore, data that has the primary key identifier may be skipped. For example, if a field c1 has a change between the V1 version and the V4 version of the record R1, and a remaining field does not change, in this case, a field c2 is queried by the data query condition, and it indicates that there is no incremental change between the first moment and the end moment, and therefore, the record R1 may be directly skipped. If the data query condition relates to the field in which the specific change occurs, the analysis result before the specific change and the analysis result after the specific change need to be separately calculated. That is, for the second historical-state data visible at the first moment, the analysis result before the specific change is generated, and for the target data obtained after the specific change visible at the end moment, the analysis result after the specific change is generated. For example, if the field c1 changes between the V1 version and the V4 version of the record R1, and exactly the field c1 is also queried by using the data query condition, the record R1 needs to participate in incremental calculation. Therefore, after all records that need to participate in incremental calculation are collected, the analysis result before the specific change needs to be calculated for an old value of the field c1 of each record, and the analysis result after the specific change is calculated for a new value of the field c1 of each record.

906. The computing device obtains a final analysis result of the target transaction based on the full analysis result and the incremental analysis result.

In some embodiments, the incremental analysis result includes an analysis result before the specific change and an analysis result after the specific change. Therefore, when the full analysis result and the incremental analysis result are combined, the full analysis result needs to be subtracted from the analysis result before the specific change, to obtain a first analysis result; and the first analysis result is added to the analysis result obtained after the specific change, to obtain the final analysis result.

In the foregoing process, in a manner of obtaining a final analysis result by combining full calculation and incremental calculation, a single-layer calculation model can be converted into a two-layer real-time analysis model, which can adapt to an HTAP system or an HTASP system that is based on a full-state database, and can save calculation resources in the entire system.

All the foregoing example technical solutions can be combined in different manners to form other embodiments of this disclosure, and details are not described herein.

According to the method provided in this embodiment of the present disclosure, a query time period is determined for a target transaction, a first moment is used as a time point boundary in the query time period, a full analysis result is obtained by means of calculation for historical-state data before the first moment, an incremental analysis result is obtained by means of calculation for data obtained after a specific change after the first moment, and the full analysis result and the incremental analysis result are combined to finally obtain a final analysis result, so that an online real-time analysis and processing service can be provided for any query time period on a full-state time line without being limited to providing an analysis function only for latest data, thereby greatly improving transaction processing performance of a database system such as an HTAP system or an HTASP system.

In a manner of obtaining a final analysis result by combining full calculation and incremental calculation, a single-layer calculation model can be converted into a two-layer real-time analysis model, which can adapt to an HTAP system or an HTASP system that is based on a full-state database, and can save calculation resources in the entire system.

In the foregoing embodiment, a transaction processing procedure of a database system such as the HTAP system or the HTASP system is described in detail. In this embodiment of the present disclosure, with reference to a specific data query statement, how a computing device in an OLAP cluster obtains a final analysis result by using a real-time analysis model is described in detail.

Figure 10:
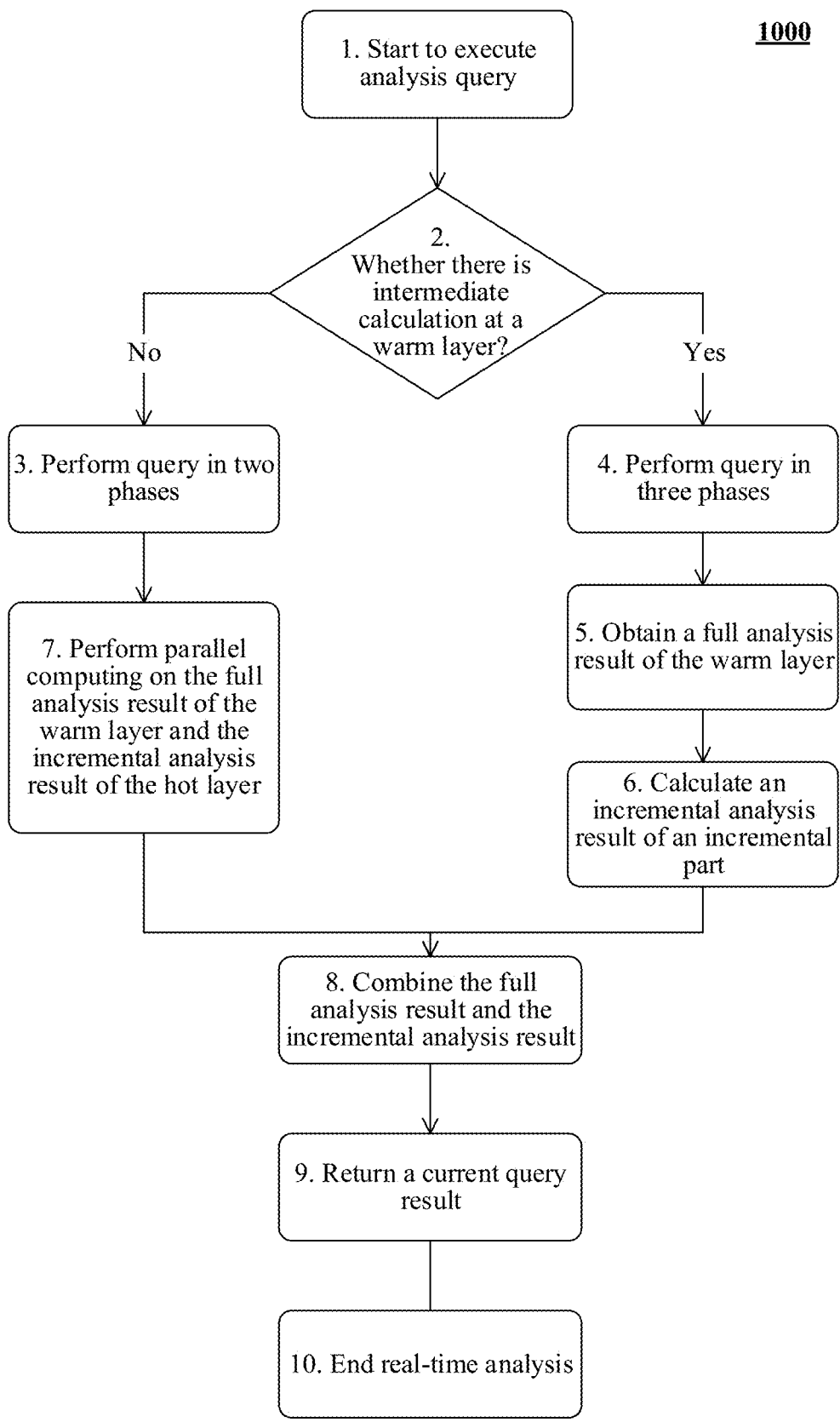
FIG. 10 is a principle flowchart of a real-time analysis model according to an embodiment of the present disclosure.

FIG. 10 is a principle flowchart of a real-time analysis model according to an embodiment of the present disclosure. As shown in FIG. 1000, when a real-time degree parameter REAL_TIME_ANALYZING DEGREE is set to 1 second and a data query statement (that is, a target transaction is a query transaction) arrives at a moment in a system, how a computing device processes the data query statement is described. It is assumed that the data query statement is:

select sum(a) from T1 where a>1.

In some embodiments, the user may add a corresponding time syntax to the data query statement to limit a target data set of query. It is assumed that the user sets no time state information as some common analysis queries, and then an online real-time analysis procedure (that is, a real-time calculation algorithm) of this data query statement includes:

Step 1: Start to execute analysis query.

In step 1, a transaction time range needs to be added for the query transaction. For example, first, the value of the real-time degree parameter REAL_TIME_ANALYZING_DEGREE is determined, that is, a real-time performance requirement of the user for the OLAP cluster is determined (assuming that REAL_TIME_ANALYZING_DEGREE is set to 1 second), and then the data query statement may be modified as follows:

```
select sum(a) from T1 FOR SYSTEM_TIME FROM min_time
    TO
    current_time-REAL_TIME_ANALYZING_DEGREE where a>1;
``` where min time refers to the start moment of the query time period, current time refers to the current moment, and current time-REAL_TIME_ANALYZING_DEGREE refers to the end moment of the query time period.

Step 2: Determine whether there is intermediate calculation (that is, an intermediate analysis result) at a warm layer. If there is intermediate calculation at the warm layer, proceed to step 4; and if there is no intermediate calculation at the warm layer, proceed to step 3.

Before starting to perform query and analysis, it is first determined whether there is a previously stored intermediate calculation result (that is, the intermediate analysis result) of the warm layer. The warm layer herein refers to a storage partition in which the warm data is located, that is, whether the intermediate analysis result is cached is queried in a storage device in a partition in which the warm data is located in the storage cluster.

Based on the foregoing division manner of four cold-hot levels, a query transaction that is usually analyzed in real time occurs at the hot layer and the warm layer (that is, most analytical transactions need to access hot data and/or warm data). Data at the cold layer and the archive layer is mainly used for separately storing old historical-state data (that is, generally, the analytical transaction does not access cold data and/or archived data, and the cold data and/or the archived data are/is merely used for separating the cold data and/or the archived data to reduce storage pressure).

Step 3: Perform query in two phases and proceed to step 7.

If there is no intermediate analysis result at the warm layer, it indicates that a previous query transaction has not executed a corresponding data analysis task; or although a previous query transaction has executed a corresponding data analysis task, the user does not choose to save the intermediate analysis result. Therefore, a full analysis result at the warm layer needs to be regenerated.

In other words, a single query time period [min_time, current_time-REAL_TIME_ANALYZING_DEGREE] in the foregoing data query statement is converted into the following two time periods: [min_time, time1, and [time1, current_time-REAL_TIME_ANALYZING_DEGREE], where time1 is a latest time period in which the real-time analysis slave copy involved in the foregoing embodiment dumps, by using a data dumping program and a background thread, real-time data of a master copy or another slave copy to a storage device in a corresponding partition of a storage cluster, that is, time1 is the first moment (a moment at which latest dumping of historical-state data that meets a data query condition of the target transaction is completed). Data stored in the real-time analysis slave copy may include a part of warm data at the warm layer (because a part of warm data may not have been completely dumped, but this does not affect analytic calculation of the query transaction).

Step 4: Perform query in three phases, and proceed to step 5.

If there is an intermediate analysis result at the warm layer, a single query time period [min_time, current_time-REAL_TIME_ANALYZING_DEGREE] in the foregoing data query statement is converted into the following three time periods: [min_time, timew), [timew, time1), and [time1, current_time-REAL_TIME_ANALYZING_DEGREE]. Finally, only two time periods: the leftmost time period [min_time, timew) and the rightmost time period [time1, current_time-REAL_TIME_ANALYZING_DEGREE] need to be calculated according to the visibility determining algorithm of the plurality of time periods described above.

Step 5: Directly obtain the previously stored full analysis result (that is, the intermediate analysis result) at the warm layer, and proceed to step 6.

Step 6: Calculate an incremental analysis result of an incremental part, and proceed to step 8.

In other words, a result set of data obtained by performing a specific change to [time1, current_time-REAL_TIME_ANALYZING_DEGREE] is calculated, and the data obtained by performing incremental calculation on the specific change is generally located at the hot layer (which is usually hot data). Certainly, if the real-time degree parameter REAL_TIME_ANALYZING_DEGREE set by the user for the OLAP cluster is relatively large, it indicates that the user does not have a high requirement for real-time performance. As a result, the data obtained by performing incremental calculation on the specific change may fall into the warm layer. In this case, incremental calculation on the data obtained by performing incremental calculation can be completely completed at the warm layer, and there is no need to interact with a related hot computing node at the hot layer in the OLTP cluster. In other words, this query transaction has no impact on a hot service at the hot layer, and can be completely decoupled.

Step 7: Perform parallel computing on the full analysis result of the warm layer and the incremental analysis result of the hot layer, and proceed to step 8.

According to the description in step 3, calculation procedures of respective analysis results in the foregoing two time periods may be started in parallel, and parallel computing has a higher calculation effect than serial calculation.

First, a full analysis result in a time period of [min_time, time1) is calculated at the warm layer. In addition, after the full analysis result is obtained by means of calculation, if the user sets to save the full analysis result, the full analysis result is saved at the warm layer for reference of a subsequent query transaction of the same type, that is, the current full analysis result is cached, and is used as an intermediate analysis result queried in step 2 for the subsequent query transaction of the same type. In some embodiments, the warm layer may periodically re-initiate full calculation once, so as to avoid a case in which because full calculation is not performed for a long time, previous full calculation is too old. Therefore, there is a case in which too many data-specific changes cause a data set to be calculated to be too large, and query performance is degraded.

Second, a result set (that is, an incremental analysis result) of data obtained after a specific change in the time period [time1, current_time-REAL_TIME_ANALYZING_DE-GREE] is calculated at the hot layer.

Step 8: Combine the full analysis result of the warm layer and the incremental analysis result of the hot layer to obtain a final analysis result.

In other words, the full analysis result of the worm layer and the result set (that is, the incremental analysis result) of the data obtained after the specific change at the hot layer are combined, to obtain the final analysis result.

Step 9: Return a current query result, that is, return the final analysis result obtained by means of combination.

Step 10: End real-time analysis.

In this embodiment of the present disclosure, the full analysis result of the worm layer and the incremental analysis result of the hot layer are combined, to provide a two-phase real-time calculation model, so that a degree of coupling between the OLTP cluster and the OLAP cluster can be minimized. To be specific, when performing real-time analysis, the OLAP cluster only needs to scan, by means of real-time analysis and by using a slave copy, data that undergoes a specific change at the hot layer of the OLTP cluster. In addition, if the user does not need extremely high real-time performance, warm data at the warm layer can meet a calculation requirement for real-time analysis, and in this case, hot data at the hot layer does not need to be accessed. In this case, the OLTP cluster is completely decoupled. In addition, because the intermediate calculation result cached at the warm layer can be reused, calculation resources can be maximally saved.

In step 7 and step 8 in the foregoing embodiment, the incremental analysis result of the data obtained after the specific change is calculated, and the full analysis result and the incremental analysis result are finally combined. In this embodiment of the present disclosure, a manner of calculating the part of incremental analysis result and a manner of combining the full+incremental analysis results are described in detail below.

In the real-time calculation model, a real-time calculation task is decomposed into a full+incremental calculation mode. A full analysis result is generated at the warm layer, and the full analysis result can be cached to achieve reuse for a plurality of times, so as to reduce a waste of calculation resources caused by repeated calculation. In addition, a calculation amount of data obtained after a specific change is controlled to a reasonable degree, so that a real-time analysis capability of the entire system presents optimal performance for a user, and user experience is improved.

Based on the previous visibility determining algorithm for the plurality of time periods, it may be learned that the time period for full calculation at the worm layer is the leftmost time period in the plurality of time periods, and the time period for incremental calculation at the hot layer is the rightmost time period in the plurality of time periods.

First, the full analysis result of the warm layer is calculated or obtained. If the intermediate analysis result is cached, the intermediate analysis result is directly obtained as the full analysis result. If the intermediate analysis result is not cached, the full analysis result needs to be calculated again.

Then, for data obtained after a specific change, because an analysis result before the specific change and an analysis result after the specific change need to be separately calculated, the analysis result before the specific change refers to an old value of each record. Because a left end value of a time period for incremental calculation is a first moment, the old value refers to a related field value of a visible version at the first moment. The analysis result after the specific change refers to a new value of each record. Because a right end value of a time period for incremental calculation is an end moment (that is, a moment obtained by subtracting a real-time degree parameter from a current moment), the new value refers to a related field value of a visible version at the end moment. To enable all new versions and old versions of data records that have the same primary key identifier to be corresponded, identification information row_id may be added to each version during calculation, so that all versions obtained by performing a plurality of specific changes on the same data record have the same row_id. For any record in the data obtained after the specific change, a visible version of the record at the first moment is determined and a visible version of the record at the end moment is determined, a field in which the specific change occurs between the two visible versions is determined, and then the following operations are performed:

(A) If a field in which a specific change occurs is not used in a data query statement of a query transaction, a current record is ignored.

(B) If a field in which a specific change occurs is related to a data query statement of a query transaction, an analysis result before the specific change is recalculated for an old value of each record. An analysis result after the specific change is re-calculated for a new value of each record.

Finally, the full analysis result of the warm layer is combined with the analysis result before the specific change and the analysis result after the specific change that are separately calculated for the new value and the old value in (B), that is, the analysis result before the specific change in (B) is subtracted from the full analysis result of the warm layer, and then the analysis result after the specific change in (B) is added to the analysis result obtained by subtracting, to obtain the final analysis result. In this case, the specific change combination algorithm ends.

In some embodiments, based on the foregoing HTAP system, a computing capability of efficient streaming real-time analysis may be further provided, to convert the HTAP system into an HTASP system, thereby achieving fastest and most efficient completion of real-time analysis and calculation, minimizing internal computing resource of the system, and improving resource utilization of the system.

For example, for the foregoing target transaction, in the streaming computing engine, if the streaming computing mode is enabled, and it is assumed that the final analysis result of the target transaction is the first full analysis result in the streaming computing, a specific incremental analysis result of a specific change in first duration is obtained every first duration (that is, the time window size in the previous embodiment) starting from an end moment of a query time period of the target transaction; and each obtained specific incremental analysis result is cached. At an interval of second duration (that is, a calculation period of the full analysis result in the previous embodiment), a current full analysis result is obtained based on a previous full analysis result and each specific incremental analysis result generated in the second duration.

The following describes an incremental+full streaming computing model.

Figure 11:
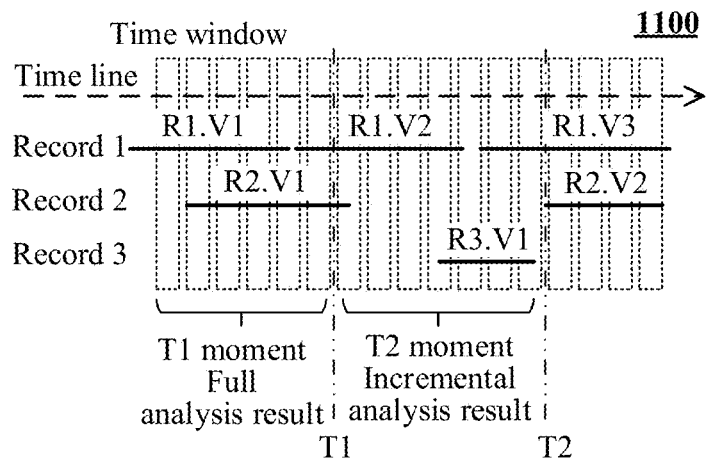
FIG. 11 is a schematic principle diagram of a storage form of a data record in a streaming computing model according to an embodiment of the present disclosure.

FIG. 11 is a schematic principle diagram of a storage form of a data record in a streaming computing model according to an embodiment of the present disclosure. As shown in 1100, for each data record, as a specific change operation performed on the data record by a transaction, each version obtained after the specific change is stored on an entire time line. Therefore, by using time windows, each version of the data record can be framed in a time window to which each version belongs on a time axis. The time window size, that is, the first duration, may be set and viewed by using the extension command in the foregoing embodiment, and incremental calculation is performed on a visible version of a data record in each time window to obtain each incremental analysis result. In addition, a calculation period based on the full analysis result, that is, the second duration, may be divided into one time line every interval of the calculation period, and all incremental analysis results in each time window in two adjacent time lines are combined, so as to finally obtain a current full analysis result. A calculation manner of the full analysis result and the incremental analysis result is the same as the calculation manner in the foregoing embodiment, and details are not described herein again.

Figure 12:
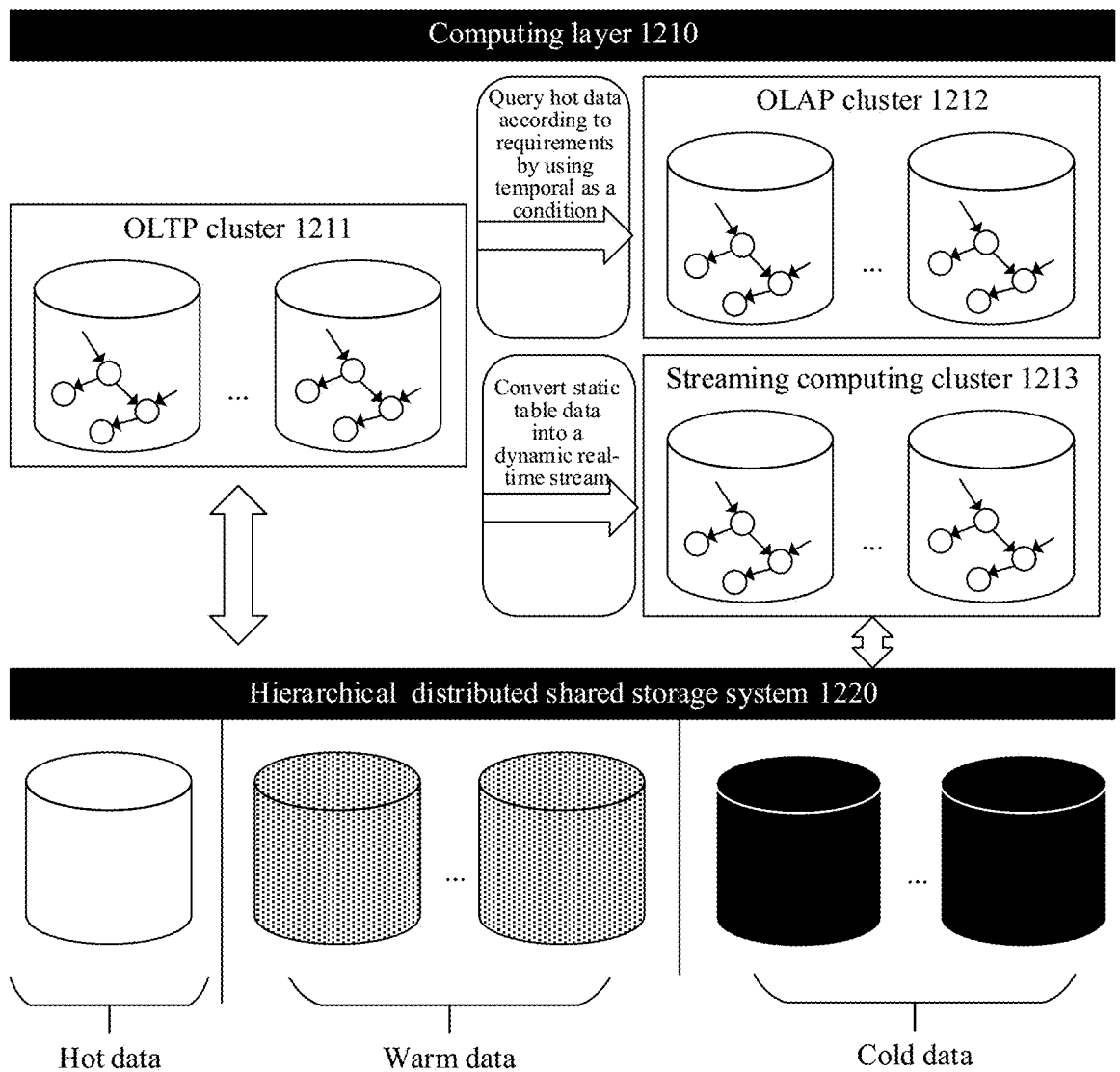
FIG. 12 is an architectural diagram of an implementation environment of an HTASP system according to an embodiment of the present disclosure.

FIG. 12 is an architectural diagram of an implementation environment of an HTASP system according to an embodiment of the present disclosure. As shown in FIG. 12, the real-time analysis system includes a computing layer 1210 and a hierarchical distributed shared storage system 1220. The computing layer 1210 includes an OLTP cluster 1211, an OLAP cluster 1212, and a streaming computing cluster 1213. The OLTP cluster 1211 generally provides an online transaction function for a short-time transactional transaction initiated on current-state data and transitional-state data, and the OLAP cluster 1212 generally provides an online analytical function for a complex analytical transaction initiated on historical-state data. The streaming computing cluster 1213 may be integrated into the OLAP cluster 1212. For example, a streaming computing engine is loaded to some or all AP computing nodes in the OLAP cluster 1212, to provide both a analysis function and a streaming analysis function. The streaming computing cluster 1213 is configured to periodically perform incremental calculation and full calculation based on the foregoing streaming computing model, so as to continuously output a full analysis result and a real-time analysis result in a continuous time period, so that the entire HTASP system has extremely high transaction analysis performance.

All the OLTP cluster 1211, the OLAP cluster 1212, and the streaming computing cluster 1213 can access full-state data stored in the hierarchical distributed shared storage system 1220. For example, all data in the system is divided into the following several partitions according to a cold-hot level of the full-state data: hot data, warm data, cold data, archived data, and the like. The classification standard of the cold-hot level has been described previously, and details are not described herein again.

In the streaming computing model, a full analysis result is periodically obtained, and before two consecutive times of full calculation, incremental analysis results are continuously obtained by using a time window as a unit. However, because full and incremental streaming computing needs to be continuously performed, a streaming computing function is provided only for an analytical transaction on which streaming computing is specified by a user. For example, the user adds a Stream field to a data query statement to specify starting of streaming computing.

In some embodiments, a rule of a query transaction initiated by each user may be macroscopically analyzed by a system. If the user initiates a type of similar query transaction at an interval of a time period (for example, a total quantity of itemized accounts in the current month is queried before a repayment date of each month), a streaming computing model for a query service of the user may be created according to a time dimension and according to a historical query transaction initiated by the user and a data feature queried by the historical query transaction. In the streaming computing model, full-state data is divided at a first level by using a calculation period of a full analysis result, and in each calculation period, data obtained after each specific change is further refined into a plurality of time windows according to a queried data feature, so as to calculate an incremental analysis result, thereby improving horizontal scalability of a calculation capability. If there are few specific data changes in a calculation period, the calculation period may be divided into only a few time windows or not be divided into a time window, and incremental calculation may be directly performed on data obtained after all specific changes in the two calculation periods.

For example, the streaming computing model includes the following steps:

Step 1: Start streaming computing.

For example, the first time window is the leftmost time period for real-time calculation, that is, the leftmost time period in a query time period specified by an initiating transaction for streaming computing. In this case, a beginning full analysis result is calculated for the initiating transaction.

Step 2: For each subsequent time window, determine a visible data-specific change set (that is, a set formed by data obtained by performing a specific change operation in the time window), and calculate an incremental analysis result for the data-specific change set, but do not perform a combination operation.

Step 3: Each time the calculation period of the full analysis result arrives, sequentially combine, based on the previous full analysis result and all incremental analysis results generated from the previous full analysis result to the current moment, to obtain a current full analysis result.

Step 4: When a user initiates a new query transaction for related data on which streaming computing is being performed, first, find and use a latest full analysis result as a basis, then sequentially combine incremental analysis results of all complete time windows obtained after the previous full analysis result, and finally, combine incremental analysis results of data obtained after a specific change occurs starting from the last time window to a moment of delivering the query transaction (a time span of this part of data is less than that of one time window, and therefore, separate calculation is required).

Step 5: Return a combined result of the new query transaction.

In this embodiment of the present disclosure, the streaming analysis algorithm can convert the real-time analysis calculation into a small quantity of incremental calculation performed by using the time window as a unit, and with backward movement of the time window, combine each incremental analysis result in any calculation period with a previous full analysis result to obtain a new full analysis result, so that the user can complete, by using a relatively stable and predictable constant execution time, the real-time analysis result of the streaming computing that has been constructed by the user. In addition, calculation efficiency of the streaming computing does not change due to an increase in a data amount, and can almost remain within an extremely small and stable execution time. In addition, sizes of the time window and the calculation period may be automatically adjusted according to a busy/idle degree of a system resource and a periodic change of a service query initiated by the user, so as to further optimize resource usage efficiency of the HTASP system.

In the foregoing embodiments, procedures of processing an analytical transaction by the HTAP system and the HTASP system are separately described, and mainly relate to a full+incremental dual-layer calculation model and a streaming computing model. However, in some embodiments, after full-state data is divided into data of different cold and hot degrees according to the classification standard of the cold-hot level, a storage model of a storage cluster may be further optimized based on the cold-hot level of the data.

Figure 13:
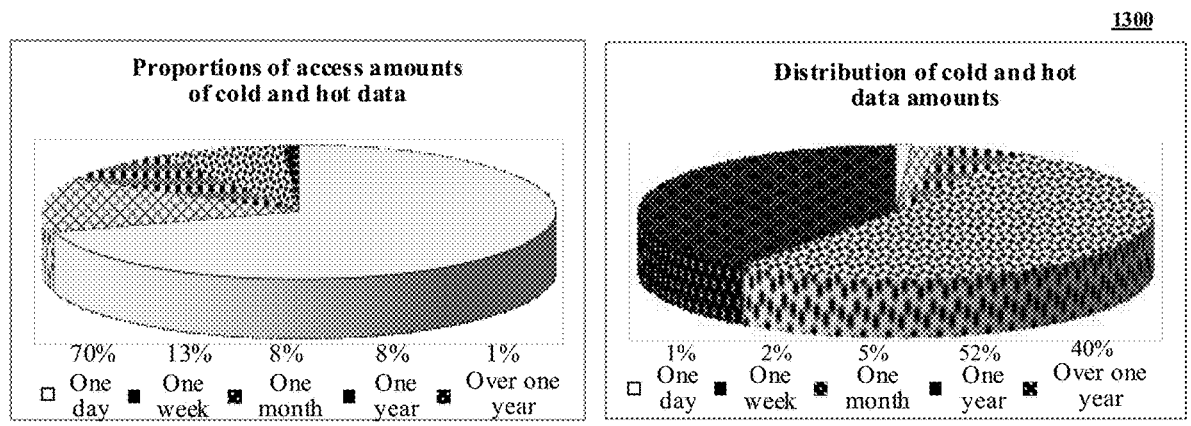
FIG. 13 is a statistical diagram of a proportion of an access amount of cold and hot data and data amount distribution according to an embodiment of the present disclosure.

FIG. 13 is a statistical diagram of a proportion of an access amount of cold and hot data and data amount distribution according to an embodiment of the present disclosure. As shown in 1300, it may be found that an active data amount of 8% in a month is responsible for 91% of the access amount, and an access mount of cold data over one year occupies only 1% of the entire access amount. Therefore, to better construct a distributed architecture of an HTAP system or an HTASP system that is based on a full-state database, so that the system can continuously provide stable access quality to the outside, data that has different access frequencies may be stored in storage media at different levels according to different cold-hot levels of the data, so that not only an SLA performance requirement of a user can be met, but also storage costs of the database can be reduced, thereby providing a high-quality and low-cost storage solution.

For example, the following four-layer storage model is used for the four types of data: hot, warm, cold, and archived:

Hot data: The data is stored in an enhanced solid state disk (SSD), and one master copy and two slave copies are saved based on the Raft consistency protocol, to ensure high availability and high reliability of data.

Warm data: The data is stored in the SSD and saves a master copy and two slave copies based on the Raft consistency protocol to ensure high availability and reliability of data.

Cold data: A cloud object storage (COS) manner is used for cloud storage. A serial advanced technology attachment (SATA) disk is a cheap storage device, and can perform redundant storage in an erasure code manner, thereby providing reliability of 99.9999999999%. Reliability of 99.9999999999% means: Because an erasure code is added when each record is being stored, an effect of high fault tolerance and a non-loss effect can be maintained even if the record does not need to store a plurality of copies. Because only some redundancy checks are added to reduce the total capacity of historical-state data, 99.9999999999% reliability is brought, that is, a probability that 0.0000000001% data is lost. In addition, even if a bad channel occurs in a disk, a remaining part may be calculated according to the erasure code, so as to calculate content of an error part.

Archived data: A content-addressable storage (CAS) manner is used for cloud storage. A SATA disk is a cheap storage device, and can store archived data at an extremely low cost. In addition, an erasure code manner is used for replacing a multi-copy manner, so that storage density can be improved, and a hard disk with programmable power off is used.

Based on the foregoing storage model, a HOT_COLD_DATA_LEVEL parameter of the classification standard of the cold-hot level may be flexibly set by the user according to a service feature of the user, so as to configure a proper storage medium for data corresponding to the cold-hot level.

In the foregoing embodiments, an HTAP system that can support an online analytical function in any time period is constructed based on a full-state database, and a streaming computing capability, that is, an HTASP system, is provided on the basis of the HTAP system. The OLTP cluster and the OLAP cluster can be effectively decoupled by fully using a time dimension of full-state data, so that the OLTP cluster provides an online transaction and analysis function for latest data in a master copy, and the OLAP cluster provides an online analytical and processing function for real-time analysis of a slave copy and historical-state data, so that the two clusters can independently calculate and run the same piece of data. In addition, the management user may determine, according to a service requirement of the management user, a real-time degree parameter of online analytics, so that the service requirement can be met, and a maximum allowed delay between the OLTP cluster and the OLAP cluster can be quantified.

In one embodiment, a real-time analysis mode of full+incremental (also called anchor+delta) calculation is introduced, so that use of calculation resources can be saved to the greatest extent, and a best real-time analysis effect can be achieved. In addition, because the time state is specific to each record level, division of a time window dimension can be added to each record in a time state at a record granularity, to provide a streaming computing capability with reference to an original data feature, thereby achieving task division at a minimum granularity of a record level, and improving calculation efficiency.

In one embodiment, the user may customize the classification standard of the cold-hot level to improve an overall service capability of the database system, and reduce usage costs of the overall database system by using partitions of different storage media of a plurality of levels of different storage devices. Because each time full-state data is modified, a corresponding historical record (that is, historical-state data) is generated. By using this feature, if a data record is not modified in a specific time, historical-state data (cold data) only needs to be dumped to a cheaper and lower-speed storage device. That is, not only the full historical-state data is stored in the database system, but also cold data and hot data can be separated, thereby ensuring stability of system processing performance. In addition, usage costs of the database can be increased by a relatively low range to match an explosive increase of data.

Figure 14:
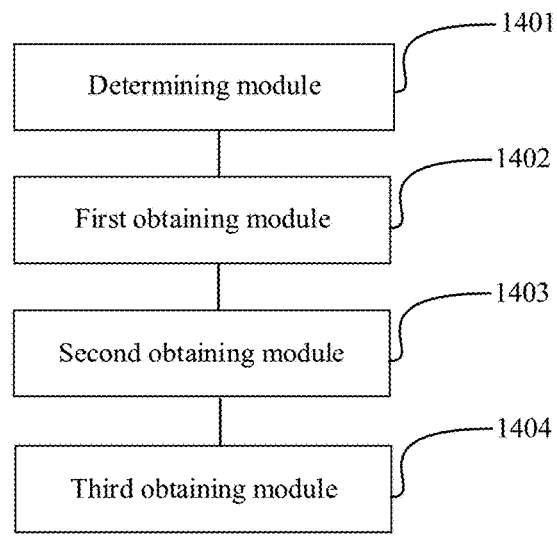
FIG. 14 is a schematic structural diagram of a transaction processing apparatus according to an embodiment of the present disclosure.

FIG. 14 is a schematic structural diagram of a transaction processing apparatus according to an embodiment of the present disclosure. Referring to FIG. 14, the apparatus includes:

a determining module 1401, configured to determine a first moment from a query time period of a target transaction, the first moment being a moment at which a most recent dumping of historical-state data is completed, and the historical-state data being data that meets a data query condition of the target transaction;

a first obtaining module 1402, configured to obtain a full analysis result based on the historical-state data, the full analysis result being a result obtained by processing the historical-state data based on analysis semantic of the target transaction;

a second obtaining module 1403, configured to obtain an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and a third obtaining module 1404, configured to obtain a final analysis result of the target transaction based on the full analysis result and the incremental analysis result.

According to the apparatus provided in this embodiment of the present disclosure, a query time period is determined for a target transaction, a first moment is used as a time point boundary in the query time period, a full analysis result is obtained by means of calculation for historical-state data before the first moment, an incremental analysis result is obtained by means of calculation for data obtained after a specific change after the first moment, and the full analysis result and the incremental analysis result are combined to finally obtain a final analysis result, so that an online real-time analysis and processing service can be provided for any query time period on a full-state time line without being limited to providing an analysis function only for latest data, thereby greatly improving transaction processing performance of a database system such as an HTAP system or an HTASP system.

In one embodiment, based on the apparatus in FIG. 14, the first obtaining module 1402 includes:

a query unit, configured to query whether an intermediate analysis result of first historical-state data visible at a second moment is cached, the second moment being any moment between a start moment of the query time period and the first moment;

a determining unit, configured to: determine the intermediate analysis result as the full analysis result in response to that the intermediate analysis result has been cached; and a first generation unit, configured to: generate the full analysis result of second historical-state data visible at the first moment in response to that the intermediate analysis result is not cached.

In one embodiment, based on the apparatus in FIG. 14, the first generation unit includes:

a determining subunit, configured to determine a cold-hot level of the second historical-state data, the cold-hot level representing a frequency of an operation performed on the second historical-state data in a historical time period;

a reading subunit, configured to read the second historical-state data from a storage device corresponding to the cold-hot level; and a processing subunit, configured to process the second historical-state data based on the analysis semantic to obtain the full analysis result.

In one embodiment, the determining subunit is configured to:

obtain a quantity of access times of the second historical-state data in the historical time period;

obtain a quantity of modification times of current-state data corresponding to the second historical-state data in the historical time period; and determine the cold-hot level based on the quantity of access times and the quantity of modification times.

In one embodiment, historical-state data of different cold-hot levels is stored in different storage devices or different storage media of a same storage device.

In one embodiment, based on the apparatus in FIG. 14, the second obtaining module 1403 includes:

an obtaining unit, configured to obtain, based on a log generated by the specific change, the data obtained by the specific change; and a second generation unit, configured to compare historical-state data that has a same primary key identifier with the data obtained by the specific change, to generate the incremental analysis result.

In one embodiment, the incremental analysis result includes an analysis result before a specific change and an analysis result after the specific change, and the second generation unit is configured to:

determine a field in which the specific change occurs for the historical-state data with the same primary key identifier and the data obtained by the specific change;

skip, in response to that the data query condition does not involve the field in which the specific change occurs, data that has the primary key identifier;

generate, in response to that the data query condition involves the field in which the specific change occurs, the analysis result before the specific change for the second historical-state data visible at the first moment; and generate the analysis result after the specific change for the target data obtained by the specific change and visible at the end moment.

In one embodiment, the third obtaining module 1404 is configured to:

subtract the analysis result before the specific change from the full analysis result, to obtain a first analysis result; and add the first analysis result to the analysis result obtained after the specific change, to obtain the final analysis result.

In one embodiment, the determining module 1401 is further configured to:

determine, as the start moment in response to that the start moment of the query time period is not specified in the target transaction, an effective moment of a latest version of data that meets the data query condition; and determine, as the end moment in response to that the end moment of the query time period is not specified in the target transaction, a moment before a current moment and whose distance to the current moment reaches a real-time degree parameter, the real-time degree parameter representing a maximum delay supported by data of analytical transaction processing in a database system.

In one embodiment, the second obtaining module 1403 is further configured to:

obtain once, at an interval of first duration starting from the end moment, a specific incremental analysis result of a specific change occurring in the first duration; and cache each obtained specific incremental analysis result.

In one embodiment, the third obtaining module 1404 is further configured to:

obtain, at an interval of second duration, a current full analysis result based on a previous full analysis result and each specific incremental analysis result generated in the second duration.

All the foregoing example technical solutions can be combined in different manners to form other embodiments of this disclosure, and details are not described herein.

When the transaction processing apparatus provided in the foregoing embodiment processes transactions, the foregoing functional modules are only described for exemplary purposes. In actual applications, the functions may be allocated to different functional modules according to requirements. That is, the internal structure of the computing device is divided into different functional modules to complete all or some of the functions described above. The disclosed module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. In addition, the embodiment of the transaction processing apparatus provided in the foregoing embodiment is based on the same idea as the embodiment of the transaction processing method. For the specific implementation process, refer to the method embodiment, and the details are not described herein again.

Figure 15:
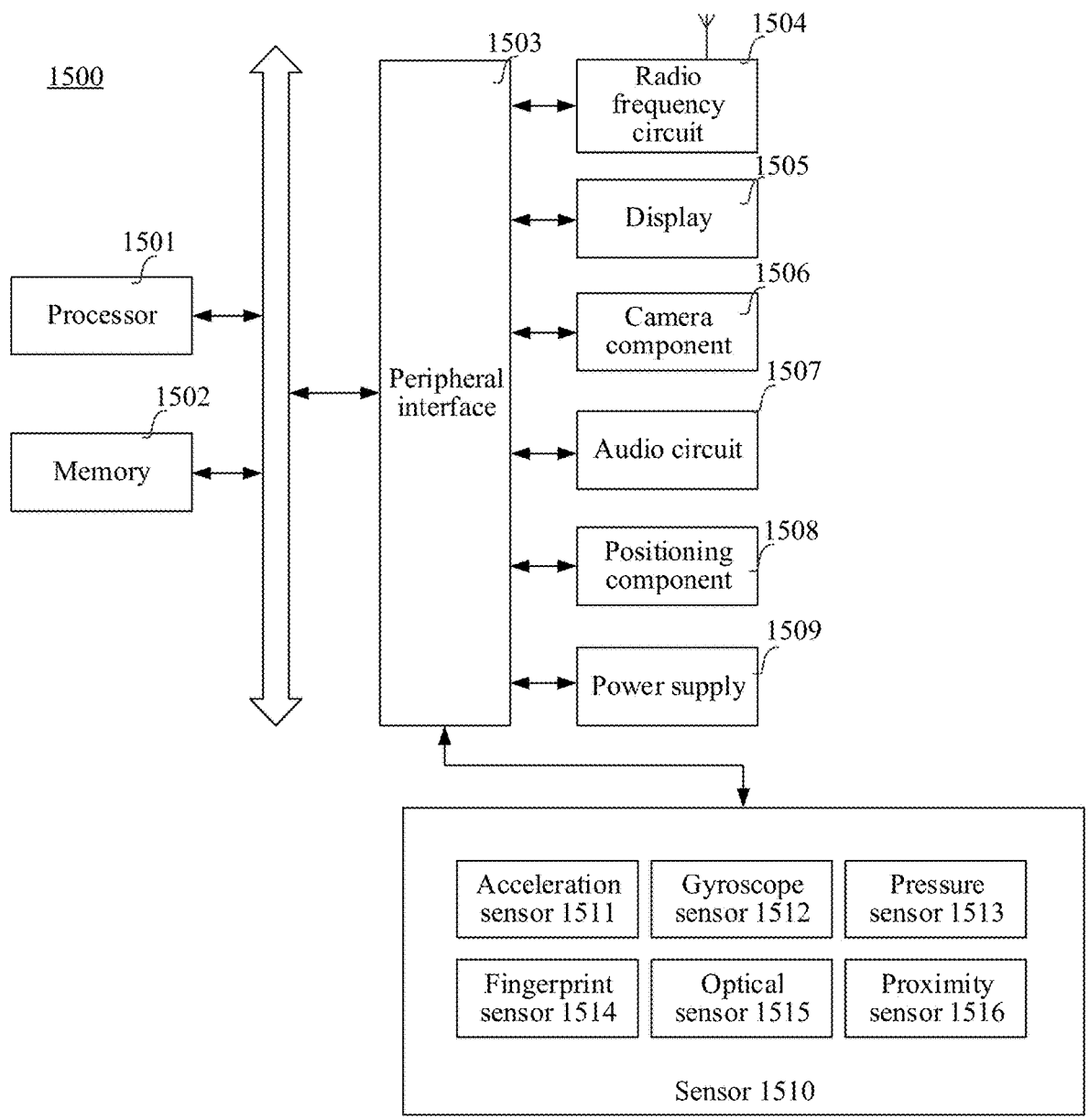
FIG. 15 is a schematic structural diagram of a computing device according to an embodiment of the present disclosure.

FIG. 15 is a schematic structural diagram of a computing device according to an embodiment of the present disclosure. As shown in FIG. 15, an example in which the computing device is a terminal 1500 is used for description. In one embodiment, a device type of the terminal 1500 includes: a smartphone, a tablet computer, a Moving Picture Experts Group Audio Layer III (MP3) player, a Moving Picture Experts Group Audio Layer IV (MP4) player, a laptop computer, or a desktop computer. The terminal 1500 may also be referred to as another name such as user equipment, a portable terminal, a laptop terminal, or a desktop terminal.

Generally, the terminal 1500 includes: a processor 1501 and a memory 1502.

In one embodiment, the processor 1501 includes one or more processing cores, for example, a four-core processor and an eight-core processor. The processor 1501 may be implemented in at least one hardware form of a digital signal processor (DSP), a field-programmable gate array (FPGA), and a programmable logic array (PLA). In some embodiments, the processor 1501 includes a main processor and a coprocessor. The main processor is configured to process data in an active state, also referred to as a central processing unit (CPU). The coprocessor is a low-power processor configured to process data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

In some embodiments, the memory 1502 includes one or more computer readable storage media, and in some embodiments, the computer readable storage medium is non-transitory. The memory 1502 may include a high-speed random access memory (RAM) and a nonvolatile memory, for example, one or more disk storage devices or flash storage devices. In some embodiments, the non-transient computer readable storage medium in the memory 1502 is configured to store at least one segment of program code, and the at least one segment of program code is used by the processor 1501 to implement the transaction processing method provided in the embodiments of the present disclosure.

In some embodiments, in some embodiments, the terminal 1500 further includes: a peripheral device interface 1503 and at least one peripheral device. The processor 1501, the memory 1502, and the peripheral device interface 1503 can be connected by using a bus or a signal cable. Each peripheral device can be connected to the peripheral device interface 1503 by using a bus, a signal cable, or a circuit board. Specifically, the peripheral device includes: at least one of a radio frequency circuit 1504, a display screen 1505, a camera component 1506, an audio circuit 1507, a positioning component 1508, and a power supply 1509.

In some embodiments, the terminal 1500 further includes one or more sensors 1510. The one or more sensors 1510 include but are not limited to: an acceleration sensor 1511, a gyroscope sensor 1512, a pressure sensor 1513, a fingerprint sensor 1514, an optical sensor 1515, and a proximity sensor 1516.

A person skilled in the art can understand that the structure shown in FIG. 15 does not constitute a limitation on the terminal 1500, and can include more or fewer components than those shown in the figure, or combine some components, or use different component arrangements.

Figure 16:
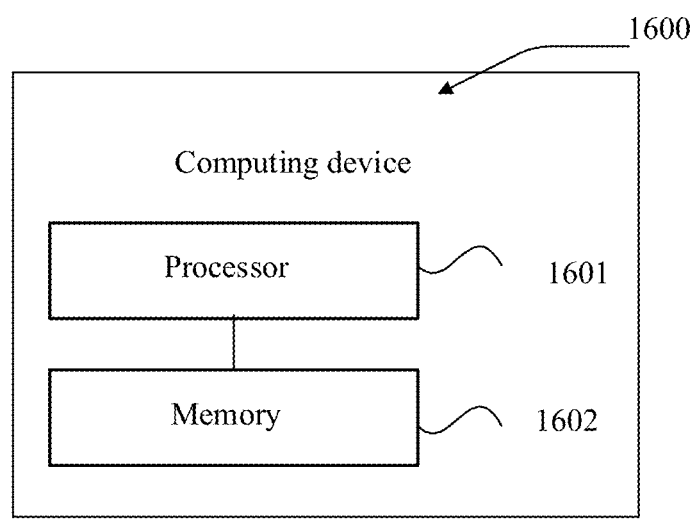
FIG. 16 is a schematic structural diagram of a computing device according to an embodiment of the present disclosure.

FIG. 16 is a schematic structural diagram of a computing device according to an embodiment of the present disclosure. A computing device 1600 may vary greatly due to different configurations or performance. The computing device 1600 includes one or more processors (CPU) 1601 and one or more memories 1602. The memory 1602 stores at least one computer program, and the at least one computer program is loaded and executed by the one or more processors 1601 to implement the transaction processing method provided in the foregoing embodiments. The computing device 1600 further includes components such as a wired or wireless network interface, a keyboard, and an input/output interface, so as to perform input/output. The computing device 1600 further includes another component configured to implement a device function. Details are not described herein.

In an example embodiment, a computer readable storage medium is further provided, for example, a memory including at least one computer program. The at least one computer program may be executed by a processor in a terminal to complete the transaction processing method in the foregoing embodiments. For example, the computer readable storage medium includes a read-only memory (ROM), a random access memory (RAM), a compact disc read-only memory (CD-ROM), a magnetic tape, a floppy disk, and an optical data storage device.

In an example embodiment, a computer program product or a computer program is further provided, including one or more pieces of program code, where the one or more pieces of program code are stored in a computer readable storage medium. One or more processors of a computing device can read the one or more pieces of program code from the computer readable storage medium, and the one or more processors execute the one or more pieces of program code, so that the computing device can execute to complete the transaction processing method in the foregoing embodiments.

A person of ordinary skill in the art can understand that all or some of the steps of the embodiments may be implemented by hardware or a program instructing relevant hardware. The program is stored in a computer readable storage medium. The storage medium is a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A transaction processing method, performed by a computing device and comprising:
    determining a first moment from a query time period of a target transaction, the first moment being a moment at which a most recent dumping of historical-state data is completed, and the historical-state data being data that meets a data query condition of the target transaction;

obtaining a full analysis result based on the historical-state data, the full analysis result being a result obtained by processing the historical-state data based on analysis semantic of the target transaction, comprising:
 querying whether an intermediate analysis result of first historical-state data visible at a second moment is cached, the second moment being a moment between a start moment of the query time period and the first moment;
 determining the intermediate analysis result as the full analysis result in response to that the intermediate analysis result is cached; and
 generating the full analysis result of second historical-state data visible at the first moment in response to that the intermediate analysis result is not cached;

obtaining an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and obtaining a final analysis result of the target transaction based on the full analysis result and the incremental analysis result.

2. The method according to claim 1, wherein the generating the full analysis result of second historical-state data visible at the first moment comprises:
 determining a cold-hot level of the second historical-state data, the cold-hot level representing a frequency of an operation performed on the second historical-state data in a historical time period;
 reading the second historical-state data from a storage device corresponding to the cold-hot level; and
 processing the second historical-state data based on the analysis semantic to obtain the full analysis result.

3. The method according to claim 2, wherein the determining a cold-hot level of the second historical-state data comprises:
 obtaining a quantity of access times of the second historical-state data in the historical time period;
 obtaining a quantity of modification times of current-state data corresponding to the second historical-state data in the historical time period; and
 determining the cold-hot level based on the quantity of access times and the quantity of modification times.

4. The method according to claim 2, wherein historical-state data of different cold-hot levels is stored in different storage devices or different storage media of a same storage device.

5. The method according to claim 1, wherein the obtaining an incremental analysis result based on a specific change that occurs on current-state data corresponding to the historical-state data comprises:
 obtaining, based on a log generated by the specific change, the data corresponding to the specific change; and
 comparing historical-state data that has a same primary key identifier with the data corresponding to the specific change, to generate the incremental analysis result.

6. The method according to claim 5, wherein the incremental analysis result comprises an analysis result before the specific change and an analysis result after the specific change, and the comparing historical-state data that has a same primary key identifier with the data corresponding to y the specific change, to generate the incremental analysis result comprises:
 determining a field in which the specific change occurs for the historical-state data with the same primary key identifier and the data corresponding to the specific change;
 skipping, in response to that the data query condition does not involve the field in which the specific change occurs, data that has the primary key identifier;
 generating, in response to that the data query condition involves the field in which the specific change occurs, the analysis result before the specific change for the second historical-state data visible at the first moment; and generating the analysis result after the specific change for the data obtained by the specific change and visible at the end moment.

7. The method according to claim 6, wherein the obtaining a final analysis result of the target transaction based on the full analysis result and the incremental analysis result comprises:
 subtracting the analysis result before the specific change from the full analysis result, to obtain a first analysis result; and
 adding the first analysis result to the analysis result after the specific change, to obtain the final analysis result.

8. The method according to claim 1, further comprising:
 determining, in response to that the start moment of the query time period is not specified in the target transaction, an effective moment of a latest version of data that meets the data query condition as the start moment; and
 determining, in response to that the end moment of the query time period is not specified in the target transaction, a moment before a current moment and whose distance to the current moment reaches a real-time degree parameter as the end moment, the real-time degree parameter representing a maximum delay supported by analytical transaction data processing in a database system.

9. The method according to claim 1, further comprising:
 obtaining, at an interval of first duration starting from the end moment, a specific incremental analysis result of the specific change occurring in the first duration; and
 caching the specific incremental analysis result.

10. The method according to claim 9, further comprising:
 obtaining, at an interval of second duration, a current full analysis result based on a previous full analysis result and the specific incremental analysis result generated in the second duration.

11. A transaction processing apparatus, deployed on a computing device and comprising:
 one or more processors and one or more memories, the one or more memories storing at least one computer program, and the at least one computer program being loaded and executed by the one or more processors to implement:
 determining a first moment from a query time period of a target transaction, the first moment being a moment at which a most recent dumping of historical-state data is completed, and the historical-state data being data that meets a data query condition of the target transaction;
 obtaining a full analysis result based on the historical-state data, the full analysis result being a result obtained by processing the historical-state data based on analysis semantic of the target transaction, comprising:

querying whether an intermediate analysis result of first historical-state data visible at a second moment is cached, the second moment being a moment between a start moment of the query time period and the first moment;

determining the intermediate analysis result as the full analysis result in response to that the intermediate analysis result is cached; and generating the full analysis result of second historical-state data visible at the first moment in response to that the intermediate analysis result is not cached;

obtaining an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and obtaining a final analysis result of the target transaction based on the full analysis result and the incremental analysis result.

12. The apparatus according to claim 11, wherein the generating the full analysis result of second historical-state data visible at the first moment comprises:

determining a cold-hot level of the second historical-state data, the cold-hot level representing a frequency of an operation performed on the second historical-state data in a historical time period;

reading the second historical-state data from a storage device corresponding to the cold-hot level; and processing the second historical-state data based on the analysis semantic to obtain the full analysis result.

13. The apparatus according to claim 12, wherein the determining a cold-hot level of the second historical-state data comprises:

obtaining a quantity of access times of the second historical-state data in the historical time period;

obtaining a quantity of modification times of current-state data corresponding to the second historical-state data in the historical time period; and determining the cold-hot level based on the quantity of access times and the quantity of modification times.

14. The apparatus according to claim 12, wherein historical-state data of different cold-hot levels is stored in different storage devices or different storage media of a same storage device.

15. The apparatus according to claim 11, wherein the obtaining an incremental analysis result based on a specific change that occurs on current-state data corresponding to the historical-state data comprises:

obtaining, based on a log generated by the specific change, the data corresponding to the specific change; and comparing historical-state data that has a same primary key identifier with the data corresponding to the specific change, to generate the incremental analysis result.

16. The apparatus according to claim 15, wherein the incremental analysis result comprises an analysis result before the specific change and an analysis result after the specific change, and the comparing historical-state data that has a same primary key identifier with the data corresponding to y the specific change, to generate the incremental analysis result comprises:

determining a field in which the specific change occurs for the historical-state data with the same primary key identifier and the data corresponding to the specific change;

skipping, in response to that the data query condition does not involve the field in which the specific change occurs, data that has the primary key identifier;

generating, in response to that the data query condition involves the field in which the specific change occurs, the analysis result before the specific change for the second historical-state data visible at the first moment; and generating the analysis result after the specific change for the data obtained by the specific change and visible at the end moment.

17. The apparatus according to claim 16, wherein the obtaining a final analysis result of the target transaction based on the full analysis result and the incremental analysis result comprises:

subtracting the analysis result before the specific change from the full analysis result, to obtain a first analysis result; and adding the first analysis result to the analysis result after the specific change, to obtain the final analysis result.

18. A non-transitory storage medium, storing at least one computer program, and the at least one computer program being loaded and executed by at least one processor to implement:

determining a first moment from a query time period of a target transaction, the first moment being a moment at which a most recent dumping of historical-state data is completed, and the historical-state data being data that meets a data query condition of the target transaction;

obtaining a full analysis result based on the historical-state data, the full analysis result being a result obtained by processing the historical-state data based on analysis semantic of the target transaction, comprising:

querying whether an intermediate analysis result of first historical-state data visible at a second moment is cached, the second moment being a moment between a start moment of the query time period and the first moment;

determining the intermediate analysis result as the full analysis result in response to that the intermediate analysis result is cached; and generating the full analysis result of second historical-state data visible at the first moment in response to that the intermediate analysis result is not cached;

obtaining an incremental analysis result based on a specific change that occurs on current-state data corresponding to the historical-state data, the specific change being a change that occurs between the first moment and an end moment of the query time period, and the incremental analysis result being a result obtained by processing, based on the analysis semantic, data obtained by the specific change; and obtaining a final analysis result of the target transaction based on the full analysis result and the incremental analysis result.

* * * * *